United States Patent
Jang et al.

(10) Patent No.: US 11,275,464 B2
(45) Date of Patent: Mar. 15, 2022

(54) TOUCH DISPLAY DEVICE AND TOUCH CIRCUIT FOR SENSING AN ACTIVE PEN TOUCH AND FINGER TOUCH

(71) Applicant: LG Display Co., Ltd., Seoul (KR)

(72) Inventors: HyungUk Jang, Paju-si (KR); NamYong Gong, Paju-si (KR); SangHyuck Bae, Seoul (KR); YoungGyu Kim, Paju-si (KR); DoYoung Jung, Seoul (KR); Hyunsuk Cho, Paju-si (KR); Jongsung Kim, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 17/022,768

(22) Filed: Sep. 16, 2020

(65) Prior Publication Data
US 2021/0124449 A1     Apr. 29, 2021

(30) Foreign Application Priority Data

Oct. 28, 2019   (KR) .......................... 10-2019-0134884

(51) Int. Cl.
*G06F 3/041*     (2006.01)
*G06F 3/044*     (2006.01)

(52) U.S. Cl.
CPC .......... *G06F 3/0412* (2013.01); *G06F 3/0445* (2019.05); *G06F 3/04162* (2019.05)

(58) Field of Classification Search
CPC ... G06F 3/0412; G06F 3/0445; G06F 3/04162
See application file for complete search history.

(56) References Cited

U.S. PATENT DOCUMENTS

2018/0113519 A1*   4/2018   Yamamoto .......... G06F 3/03545
2019/0204939 A1    7/2019   Ju et al.

FOREIGN PATENT DOCUMENTS

EP    3422160 A1    1/2019
EP    3462291 A1    4/2019

OTHER PUBLICATIONS

Combined Search and Examination Report issued in UK Patent Application No. 2014780.7, dated Apr. 15, 2021, 17 pages.

* cited by examiner

*Primary Examiner* — Lisa S Landis
(74) *Attorney, Agent, or Firm* — Fenwick & West LLP

(57) ABSTRACT

Provided are a touch display device and a touch circuit that can effectively simultaneously sense a plurality of pens in a predetermined touch frame time (a driving time) by simultaneously performing sensing of pen information and sensing of a pen position using pen data.

19 Claims, 30 Drawing Sheets

*FIG.24A*

| TP | #1 | #2 | #3 | #4 | #5 | #6 | #7 | #8 | #9 | #10 | #11 | #12 | #13 | #14 | #15 | #16 |
|---|---|---|---|---|---|---|---|---|---|---|---|---|---|---|---|---|
| configuration | B | P1 | P2 | P3 | P4 | T1 | T2 | T3 | T4 | P1 | P2 | P3 | P4 | F | F | F |

*FIG.24B*

| TP | #1 | #2 | #3 | #4 | #5 | #6 | #7 | #8 | #9 | #10 | #11 | #12 | #13 | #14 | #15 | #16 |
|---|---|---|---|---|---|---|---|---|---|---|---|---|---|---|---|---|
| configuration | B | P1 | P2 | T1 | T2 | P1 | P2 | F | F | P1 | P2 | T1 | T2 | P1 | P2 | F |

*FIG.24C*

| TP | #1 | #2 | #3 | #4 | #5 | #6 | #7 | #8 | #9 | #10 | #11 | #12 | #13 | #14 | #15 | #16 |
|---|---|---|---|---|---|---|---|---|---|---|---|---|---|---|---|---|
| configuration | B | P1 | T1 | P1 | F | P1 | T1 | P1 | F | P1 | T1 | P1 | F | P1 | T1 | P1 |

FIG.25

| Step | ULS | DLS | | | |
|---|---|---|---|---|---|
| | | Pen 1 | Pen 2 | Pen 3 | Pen 4 |
| 1 | 0:Tone | 0:Full tone | 0:Full tone | 0:Full tone | 0:Full tone |
| 2 | 0:ID | 0:ID | 0:ID | 0:ID | 0:ID |
| 3 | 0:Pair1 | 1: Default Quarter | 0:ID | 0:ID | 0:ID |
| 4 | 1:Pair2 | 1: Default Quarter | 2: Default Quarter | 0:ID | 0:ID |
| 5 | 2:Pair3 | 1: Default Quarter | 2: Default Quarter | 3: Default Quarter | 0:ID |
| 6 | 3:Pair4 | 1: Default Quarter | 2: Default Quarter | 3: Default Quarter | 4: Default Quarter |

TOUCH DISPLAY DEVICE AND TOUCH CIRCUIT FOR SENSING AN ACTIVE PEN TOUCH AND FINGER TOUCH

CROSS REFERENCE TO RELATED APPLICATION

This application claims priority from Republic of Korea Patent Application No. 10-2019-0134884, filed on Oct. 28, 2019, which is hereby incorporated by reference in its entirety.

BACKGROUND

Field of the Present Disclosure

Embodiments of the present disclosure relate to a touch display device and a touch circuit.

Discussion of the Related Art

With advancement in information-oriented society, requirements for various types of display devices that display an image have increased. Various types of display devices such as liquid crystal display devices and organic light emitting display devices have been widely used.

Such display devices provide a touch-based input system that allows a user to intuitively and conveniently input information or a command instead of a normal input system using buttons, a keyboard, a mouse, and the like.

Pen touch techniques in addition to finger touch techniques have been developed with an increase in requirements for an accurate pen touch input. In addition, requirements for pen touch techniques that can process a touch input with a plurality of pens as well as one pen are increasing.

However, since a touch display device should provide a function of sensing a finger touch and a pen touch should be provided along with a display function in a predetermined driving time, there are problems that a driving time is not sufficient or display performance or touch sensing performance is poor and effective solutions thereto have not been found out.

SUMMARY

Embodiments of the present disclosure provide a touch display device and a touch circuit that can provide a display function and a finger touch sensing function and effectively simultaneously sense a plurality of pens.

Embodiments of the present disclosure provide a touch display device and a touch circuit that can rapidly process pairing between the display device and a plurality of pens within a short time.

According to an aspect of the present disclosure, there is provided a touch display device includes: a touch panel in which a plurality of touch electrodes are arranged; and a touch circuit that applies an uplink signal to all or some of the plurality of touch electrodes in N touch time sections included in each touch frame time and receives a downlink signal output from the one or more pens having received the uplink signal via one or more touch electrodes of the plurality of touch electrodes.

The touch circuit receives pen data via the one or more touch electrodes from the one or more pens and simultaneously senses pen information and a pen position of the one or more pens based on the pen data, the pen data is a downlink signal output from the one or more pens, and a voltage level of the pen data changes irregularly or aperiodically.

The N touch time sections may include Nu uplink transmission time sections in which an uplink signal in which a voltage level changes irregularly or aperiodically is transmitted from the touch panel to the one or more pens, Nd downlink transmission time sections in which a downlink signal is transmitted from the one or more pens to the touch panel, and Nf finger sensing time sections in which a finger touch is sensed.

$Nu \geq 1$, $Nd \geq 1$, and $Nf \geq 1$ in one touch frame time may be satisfied.

The Nd downlink transmission time sections may include Np pen position sensing time sections. $1 \leq Np \leq Nd$ may be satisfied.

The touch circuit may receive pen data which is a downlink signal output from the one or more pens and in which a voltage level changes irregularly or aperiodically from the one or more pens via the one or more touch electrodes out of the plurality of touch electrodes and simultaneously sense pen information and a pen position of the one or more pens on the basis of the pen data.

In each uplink transmission time section, the touch circuit may apply a beacon signal which is an uplink signal transmitted to the one or more pens and in which pen driving control information is expressed by change of a voltage level to all or some of the plurality of touch electrodes.

A signal waveform of the downlink signal which is output from the one or more pens in each downlink transmission time section may change according to the beacon signal.

The Nd downlink transmission time sections may include Nt pen tilt sensing time sections and the Np pen position sensing time sections. $Np+Nt=Nd$ may be satisfied.

Between the Nt pen tilt sensing time sections and the Np pen position sensing time sections, a type of a tip via which the downlink signal is output from the one or more pens may be different and a signal waveform of the downlink signal output from the one or more pens may be different.

In the pen position sensing time sections, the touch circuit may receive the pen data which is a downlink signal output from a first tip of the one or more pens and in which a voltage level changes irregularly or aperiodically via the one or more touch electrodes and simultaneously sense the pen information and the pen position of the one or more pens on the basis of the pen data.

In the pen tilt sensing time sections, the touch circuit may receive a pen tilt signal which is a downlink signal output from a second tip which is different in shape from the first tip of the one or more pens and in which a voltage level changes regularly or periodically via the one or more touch electrodes and sense a pen tilt of the one or more pens on the basis of the pen tilt signal.

The Nd downlink transmission time sections may include Ni pen data transmission time sections and the Np pen position sensing time sections. $Np+Ni=Nd$ may be satisfied.

Between the Nt pen tilt sensing time sections and the Np pen position sensing time sections, a type of a tip via which the downlink signal is output from the one or more pens may be the same.

In the pen position sensing time sections, the touch circuit may receive the pen data which is a downlink signal output from a first tip of the pen and in which a voltage level changes irregularly or aperiodically via the one or more touch electrodes and simultaneously sense the pen information and the pen position of the one or more pens on the basis of the pen data.

In the pen data transmission time sections, the touch circuit may receive other pen data which is a downlink signal output from the first tip of the one or more pens and in which a voltage level changes irregularly or aperiodically via the one or more touch electrodes and sense other pen information of the one or more pens on the basis of the other pen data.

The touch circuit may apply a beacon signal in which a voltage level changes irregularly or aperiodically to all or some of the plurality of touch electrodes in the Nu uplink transmission time sections.

The touch circuit may apply a DC voltage in which a voltage level is constant to all or some of the plurality of touch electrodes in the Nd downlink transmission time sections, and apply a touch driving signal in which a voltage level changes regularly or periodically to all or some of the plurality of touch electrodes in the Nf finger sensing time sections.

A pen pulse signal which is output from the one or more pens and in which a voltage level changes regularly or periodically may be applied to the one or more touch electrodes out of the plurality of touch electrodes.

The pen pulse signal may correspond to the touch driving signal in frequency and phase.

The pen data which is received via the one or more touch electrodes in the touch circuit in the Np pen position sensing time sections may include a plurality of pulses. A high-level section of at least one pulse out of the plurality of pulses may be longer than the high-level section of other pulses, and a low-level section of at least one pulse out of the plurality of pulses may be longer than the low-level section of other pulses.

The pen data may include a plurality of sections in which a plurality of symbols corresponding to the pen information are expressed and the plurality of sections may include two sections including pulses.

The two sections may include pulses having the same phase or pulses having phases opposite to each other.

One of the two sections may include pulses having the same phase as a driving signal which is applied from the touch circuit to the touch panel and in which a voltage level changes regularly or periodically, and the other of the two sections may include pulses having a phase opposite to those of the driving signal.

The plurality of sections may include a section which has a DC voltage or which is electrically floating.

The touch circuit may output an uplink signal including a command to cause the one or more pens approaching the touch panel to react to the touch panel in the uplink transmission time sections of a first touch frame time.

The touch circuit may receive a downlink signal which is output from a first pen and which includes a first specific pen ID via the touch panel and receive a downlink signal which is output from a second pen and which includes a second specific pen ID via the touch panel in the downlink transmission time sections of a second touch frame time.

The touch circuit may output an uplink signal which includes a first temporary pen ID given to the first pen or which includes pairing information including information corresponding to the first temporary pen ID to the touch panel in the uplink transmission time sections of a third touch frame time. The touch circuit may receive a downlink signal which is output from the second pen and which includes the second specific pen ID again via the touch panel in the downlink transmission time sections of the third touch frame time.

The pairing information may include a hash value of the first specific pen ID.

Each touch frame time may be K or 1/K times an update cycle of a display frame, where K is an integer equal to or greater than 1.

The touch circuit may change a pen mode depending on the number of pens which simultaneously operate cooperatively in one touch frame time.

The touch circuit may control an allocation order of the Nd downlink transmission time sections and the Nf finger sensing time sections in the one touch frame time, control the number of downlink transmission time section which are allocated to the pen position sensing time sections for each pen in the one touch frame time, or control the number of downlink transmission time section which are allocated to the pen tilt sensing time sections for each pen in the one touch frame time at the time of changing the pen mode.

When the number of pens which simultaneously operate in the one touch frame time increases and the pen mode is changed, the number of downlink transmission time section which are allocated to the pen position sensing time sections for each pen in the one touch frame time may decrease and the number of downlink transmission time section which are allocated to the pen tilt sensing time sections for each pen in the one touch frame time may decrease.

A sensing speed of one or more of a pen position, a pen tilt, and pen information may be changed at the time of changing the pen mode.

When the number of pens which are to be sensed in one touch frame time is m, the number of downlink transmission time section in the one touch frame time may be equal to or greater than 3×m.

For example, in one touch frame time, the number of touch time sections N may be 16, the number of uplink transmission time sections Nu may be one, the number of downlink transmission time sections may be 12, and the number of finger sensing time sections Nf may be equal to or greater than 3.

According to another aspect of the present disclosure, there is provided a touch circuit of a touch display device, including: a signal transmitting/receiving circuit that applies an uplink signal to all or some of a plurality of touch electrodes included in a touch panel in N touch time sections included in each touch frame time and receives a downlink signal output from one or more pens having received the uplink signal via the touch panel via one or more touch electrodes of the plurality of touch electrodes; and an analog-to-digital conversion circuit that generates a digital sensing value for the downlink signal.

The signal transmitting/receiving circuit receives pen data via the one or more touch electrodes among the plurality of touch electrodes and simultaneously generates and outputs sensing data for sensing pen information and a pen position of the one or more pens based on the pen data, the pen data is a downlink signal output from the one or more pens, a voltage level of the pen data changes irregularly or aperiodically.

The N touch time sections may include Nu uplink transmission time sections in which an uplink signal in which a voltage level changes irregularly or aperiodically is transmitted from the touch panel to the one or more pens, Nd downlink transmission time sections in which a downlink signal is transmitted from the one or more pens to the touch panel, and Nf finger sensing time sections in which a finger touch is sensed.

The Nd downlink transmission time sections may include Np pen position sensing time sections and Nu≥1, Nd≥1, Nf≥1, and 1≤Np≤Nd may be satisfied.

The signal transmitting/receiving circuit may receive pen data which is a downlink signal output from the one or more pens and in which a voltage level changes irregularly or aperiodically from the one or more pens via the one or more touch electrodes out of the plurality of touch electrodes and generate and output sensing data for simultaneously sensing pen information and a pen position of the one or more pens on the basis of the pen data.

The signal transmitting/receiving circuit may apply a beacon signal in which a voltage level changes irregularly or aperiodically to all or some of the plurality of touch electrodes in the Nu uplink transmission time sections.

The signal transmitting/receiving circuit may apply a DC voltage in which a voltage level is constant to all or some of the plurality of touch electrodes in the Nd downlink transmission time sections.

The signal transmitting/receiving circuit may apply a touch driving signal in which a voltage level changes regularly or periodically to all or some of the plurality of touch electrodes in the Nf finger sensing time sections.

The signal transmitting/receiving circuit may output an uplink signal including a command to cause the one or more pens approaching the touch panel to react to the touch panel in the uplink transmission time sections of a first touch frame time.

The signal transmitting/receiving circuit may receive a downlink signal including a first specific pen ID from a first pen in the downlink transmission time sections allocated for the first pen in a second touch frame time.

The signal transmitting/receiving circuit may receive a downlink signal including a second specific pen ID from a second pen in the downlink transmission time sections allocated for the second pen in the second touch frame time.

The signal transmitting/receiving circuit may output an uplink signal including a first temporary pen ID given to the first pen or pairing information including information corresponding to the first temporary pen ID in the uplink transmission time sections of a third touch frame time.

The signal transmitting/receiving circuit may receive a downlink signal including the second specific pen ID from the second pen again in the downlink transmission time sections allocated for the second pen in the third touch frame time.

The pairing information may include a hash value of the first specific pen ID.

According to the embodiments of the present disclosure, it is possible to provide a display function and a finger touch sensing function and to effectively simultaneously sense a plurality of pens.

According to the embodiments of the present disclosure, it is possible to effectively simultaneously sense a plurality of pens in a predetermined touch frame time (a driving time) by simultaneously sensing pen information and sensing a pen position using pen data.

According to the embodiments of the present disclosure, it is possible to rapidly process pairing between a touch display device and a plurality of pens within a short time.

BRIEF DESCRIPTION OF THE DRAWINGS

FIGS. 24A, 24B, and 24C are diagrams illustrating configurations of touch time sections for a 4-pen mode, a 2-pen mode, and a 1-pen mode in the touch display device according to embodiments of the present disclosure; and FIGS. 25 and 26 are diagrams illustrating a routine of pairing the touch display device according to embodiments of the present disclosure with four pens.

DETAILED DESCRIPTION

Figure 1:
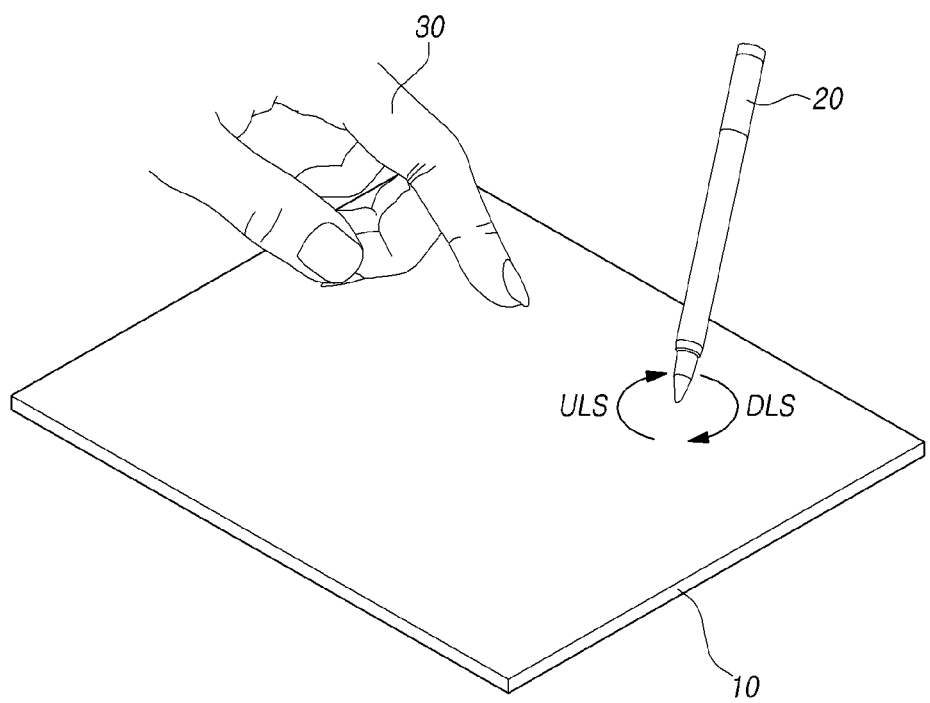
FIG. 1 is a diagram illustrating a touch display device according to an embodiment of the present disclosure.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present invention, detailed descriptions of well-known functions and components incorporated herein will be omitted when it is determined that the description may make the subject matter in some embodiments of the present invention rather unclear. The terms such as "including," "having," "containing," "constituting," "make up of," and "formed of" used herein are generally intended to allow other components to be added unless the terms are used with the term "only". As used herein, singular forms are intended to include plural forms unless the context clearly indicates otherwise.

Terms such as "first," "second," "A," "B," "(A)," and "(B)" may be used herein to describe elements of the present invention. Each of these terms is not used to define essence, order, sequence, or number of elements etc., but is used merely to distinguish the corresponding element from other elements.

When it is mentioned that a first element "is connected or coupled to," "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to," "contact or overlap," etc. each other via a fourth element. Here, the second element may be included in at least one of two or more elements that "are connected or coupled to," "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can."

FIG. 1 is a diagram illustrating a touch display device 10 according to embodiments of the present disclosure.

A touch system according to embodiments of the present disclosure includes a touch display device 10 and a pen 20 that operates in cooperation therewith.

The touch display device 10 is an electronic device that can provide a touch sensing function (a finger touch sensing function) for a finger 30 or a touch pointer (for example, a passive pen) having characteristics equivalent thereto and a pen touch sensing function (a pen recognition function) for one or more pens 20 in addition to an image display function.

One or more pens 20 are also referred to as an active pen, have a signal transmitting/receiving function, perform a cooperative operation with the touch display device 10, and include a power supply built therein. In this specification, for the purpose of convenience of explanation, an active pen is simply referred to as a "pen 20."

Accordingly, a pen 20 in this specification may also be referred to as a stylus, a stylus pen, or an active stylus pen as well as an active pen.

A passive pen which is distinguished from the pen 20 in this specification does not include a signal transmitting/receiving function, a cooperating operation with the touch display device 10, and a power supply built therein. A touch of a passive pen can be sensed in the same way as sensing a touch of a finger 30.

A pen 20 corresponding to an active pen is an active touch input tool having a function of transmitting and receiving a signal to and from the touch display device 10, and a finger 30, passive pen, or the like is a passive touch input tool not having a function of transmitting and receiving a signal to and from the touch display device 10.

For the purpose of sensing a pen touch, the pen 20 supplies a downlink signal DLS to the touch display device 10, and the touch display device 10 supplies an uplink signal ULS to the pen 20.

In the following description, for the purpose of convenience of explanation, a passive touch input tool is representatively referred to as a finger 30. The finger 30 which is described below should be construed as including all passive touch input tools such as a passive pen.

The touch display device 10 according to embodiments of the present disclosure may be, for example, a television TV or a monitor or may be a mobile device such as a tablet or a smartphone.

The touch display device 10 according to embodiments of the present disclosure includes a display part that provides an image display function and a touch sensing part that provides a touch sensing function.

Figure 2:
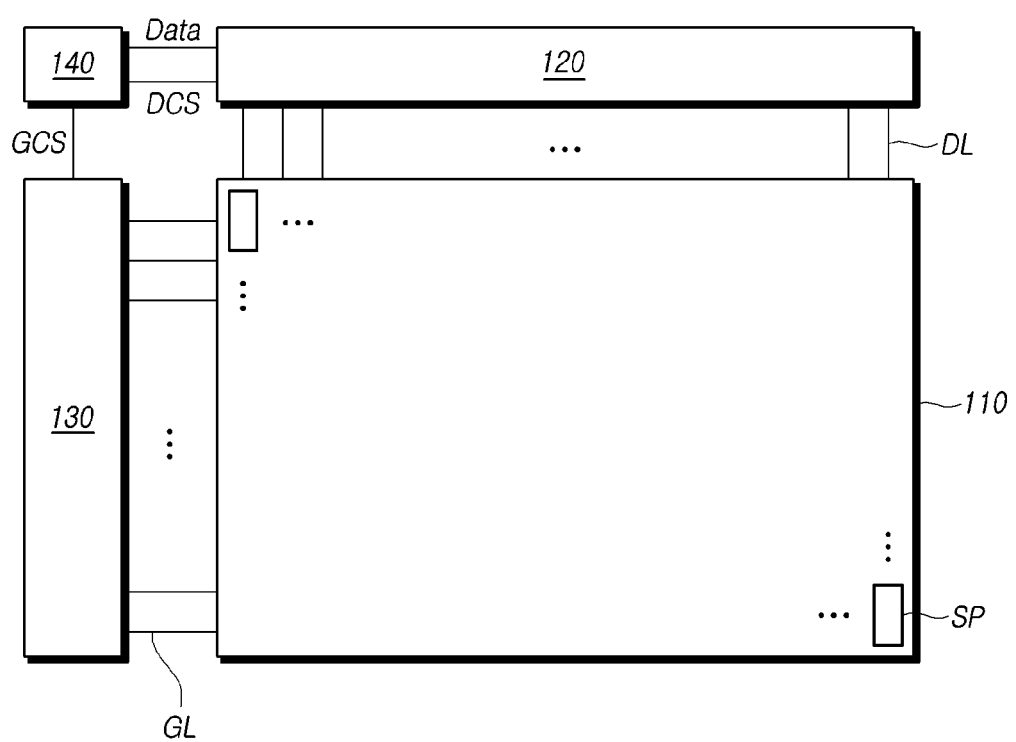
FIG. 2 is a diagram illustrating a display part of the touch display device according to embodiments of the present disclosure.

FIG. 2 is a diagram illustrating a display part of the touch display device 10 according to embodiments of the present disclosure.

Referring to FIG. 2, the display part of the touch display device 10 according to embodiments of the present disclosure includes a display panel 110, a data driving circuit 120, a gate driving circuit 130, and a controller 140.

In the display panel 110, a plurality of data lines DL and a plurality of gate lines GL are arranged, and a plurality of subpixels SP which are defined by the plurality of data lines DL and the plurality of gate lines GL are arranged.

The data driving circuit 120 supplies a data voltage to the plurality of data lines DL to drive the plurality of data lines DL.

The gate driving circuit 130 sequentially supplies a scan signal to the plurality of gate lines GL to drive the plurality of gate lines GL.

The controller 140 supplies various control signals DCS and GCS to the data driving circuit 120 and the gate driving circuit 130 to control the operations of the data driving circuit 120 and the gate driving circuit 130.

The controller 140 starts scanning at timings in each frame, converts input image data which is input from the outside to correspond to a data signal format which is used in the data driving circuit 120, outputs the converted image data Data, and controls data driving at appropriate timings based on the scanning.

The controller 140 may be a timing controller which is used for normal display technology or a control device that includes the timing controller and additionally performs another control function.

The controller 140 may be embodied by a component which is separate from the data driving circuit 120 or may be embodied by an integrated circuit along with the data driving circuit 120.

On the other hand, the data driving circuit 120 may be embodied to include at least one source driver integrated circuit.

Each source driver integrated circuit includes a shift register, a latch circuit, a digital-to-analog converter DAC, and an output buffer.

Each source driver integrated circuit may further include an analog-to-digital converter ADC in some cases.

The gate driving circuit 130 may be embodied to include at least one gate driver integrated circuit.

Each gate driver integrated circuit includes a shift register and a level shifter.

The data driving circuit 120 may be disposed on only one side (for example, the upper side or the lower side) of the display panel 110 or may be disposed on both sides (for example, the upper side and the lower side) of the display panel 110 depending on a driving system, a panel design system, or the like in some cases.

The gate driving circuit 130 may be disposed on only one side (for example, the right side or the left side) of the display panel 110 or may be disposed on both sides (for example, the right side and the left side) of the display panel 110 depending on a driving system, a panel design system, or the like in some cases.

Figure 3:
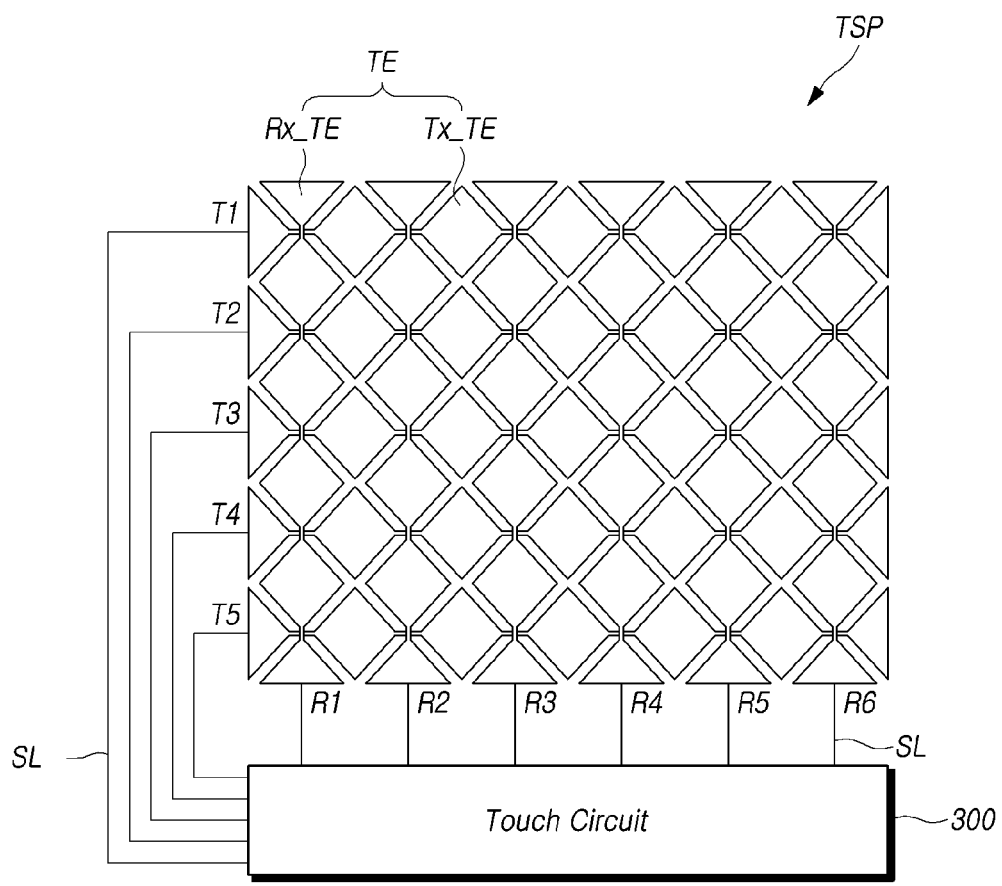
FIG. 3 is a diagram illustrating a touch sensing part of the touch display device according to embodiments of the present disclosure.
Figure 4:
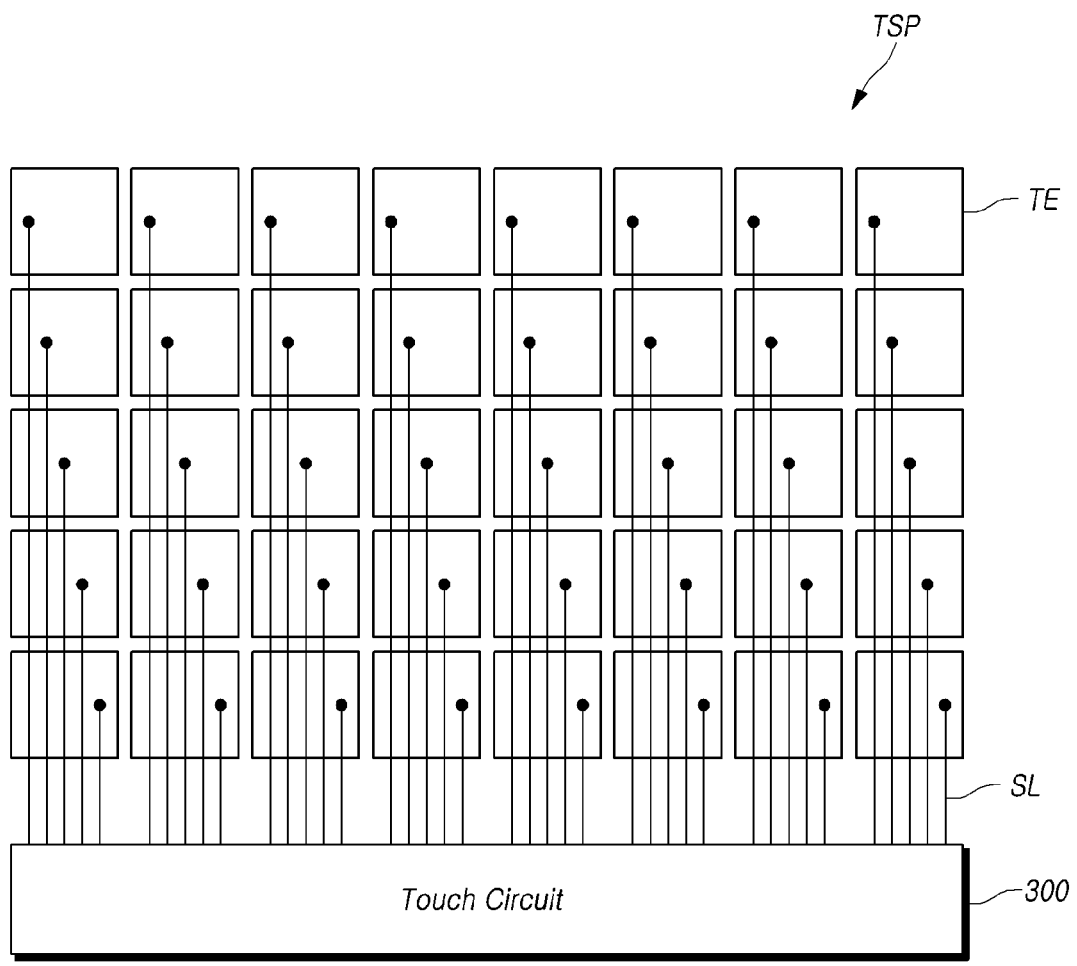
FIG. 4 is a diagram illustrating another example of the touch sensing part of the touch display device according to embodiments of the present disclosure.

FIG. 3 is a diagram illustrating the touch sensing part of the touch display device 10 according to embodiments of the present disclosure. FIG. 4 is a diagram illustrating the touch sensing part of the touch display device 10 according to embodiments of the present disclosure.

Referring to FIGS. 3 and 4, the touch display device 10 according to embodiments of the present disclosure includes a touch panel TSP in which touch electrodes TE are arranged and a touch circuit 300 that drives the touch panel TSP in order to sense a touch with a pen 20 or a finger 30.

Referring to FIG. 3, the touch display device 10 provides a mutual-capacitance-based touch sensing function of sensing a touch input by measuring a capacitance which is formed between two types of touch electrodes Tx_TE and Rx_TE or a change thereof.

Referring to FIG. 3, for the mutual-capacitance-based touch sensing function, first touch electrode lines T1 to T5 (also referred to as touch driving lines) to which a touch driving signal is applied and second touch electrode lines R1 to R6 (also referred to as touch sensing lines) are arranged to cross each other in the touch panel TSP.

Each of the first touch electrode lines T1 to T5 may be a bar-shaped electrode extending in a horizontal direction, and each of the second touch electrode lines R1 to R6 may be a bar-shaped electrode extending in a vertical direction.

On the other hand, as illustrated in FIG. 3, each of the first touch electrode lines T1 to T5 may be formed by electrically connecting first touch electrodes Tx_TE (also referred to as touch driving electrodes) which are arranged in the same row. Each of the second touch electrode lines R1 to R6 may be formed by electrically connecting second touch electrodes Rx_TE (also referred to as touch sensing electrodes) which are arranged in the same column.

Each of the first touch electrode lines T1 to T5 is electrically connected to the touch circuit 300 via one or more signal lines SL. Each of the second touch electrode lines R1 to R6 is electrically connected to the touch circuit 300 via one or more signal lines SL.

Referring to FIG. 4, the touch display device 10 provides a self-capacitance-based touch sensing function of sensing a touch input by measuring a capacitance which is formed by each touch electrode along with a finger 30 or a change thereof.

Referring to FIG. 4, for the purse of the self-capacitance-based touch sensing function, a plurality of touch electrodes are arranged in a separated state in the touch panel TSP.

Each of the plurality of touch electrodes TE is supplied with a touch driving signal and senses a touch sensing signal. Each of the plurality of touch electrodes TE is electrically connected to the touch circuit 300 via one or more signal lines SL.

The shape of one touch electrode TE illustrated in FIG. 3 or 4 is only an example and can be designed in various forms.

The size of an area in which one touch electrode TE is formed may correspond to the size of an area in which one subpixel SP is formed.

The size of an area in which one touch electrode TE is formed may equal to or greater than the size of an area in which two or more subpixels SP are formed. In this case, one touch electrode TE overlaps two or more data lines DL and two or more gate lines GL. For example, the size of an area in which one touch electrode TE is formed may correspond to the size of an area in which several to several tens of subpixels SP are formed.

On the other hand, the touch panel TSP 150 may be an outer-mounted type (also referred to as an add-on type) which is provided outside the display panel 110 and then coupled to the display panel 110 or may be an inner-mounted type (also referred to as an in-cell type or an on-cell type) which is mounted inside the display panel 110.

The touch display device 10 according to embodiments of the present disclosure may be a liquid crystal display (LCD), an organic light emitting diode (OLED) display, or a quantum dot display, but is not limited thereto and may be any type of display as long as touch-relevant elements, structures, and a touch sensing method, and the like which will be described below can be applied thereto.

For example, when the touch display device 10 according to embodiments of the present disclosure is a liquid crystal display device, the touch electrodes TE may be common electrodes which are provided in the display panel 110 and to which a common voltage for display driving is applied.

For example, when the touch display device 10 according to embodiments of the present disclosure is an OLED display, the touch display device may have a top emission structure in which light is emitted from the top of the display panel 110 or a bottom emission structure in which light is emitted from the bottom of the display panel 110. When the touch display device 10 according to embodiments of the present disclosure is an OLED display, the touch electrodes TE are provided in the display panel 110 and on an encapsulation layer which is located on transistors and organic light emitting diodes (OLED). The positions of the touch electrodes TE may be further suitable for the top emission structure. The touch electrodes TE may be of a mesh type with openings for emission efficiency and may be transparent electrodes or may further include transparent electrodes. When the touch display device 10 according to embodiments of the present disclosure is an OLED display, the touch electrodes TE may be anode electrodes of organic light emitting diodes (OLED) provided in the display panel 110 or may be electrodes in various layers located below the anode electrodes.

The touch electrodes TE included in the touch display device 10 according to embodiments of the present disclosure may be dedicated electrodes for touch sensing or may be electrodes which can be used for both display driving and touch sensing.

Figure 5:
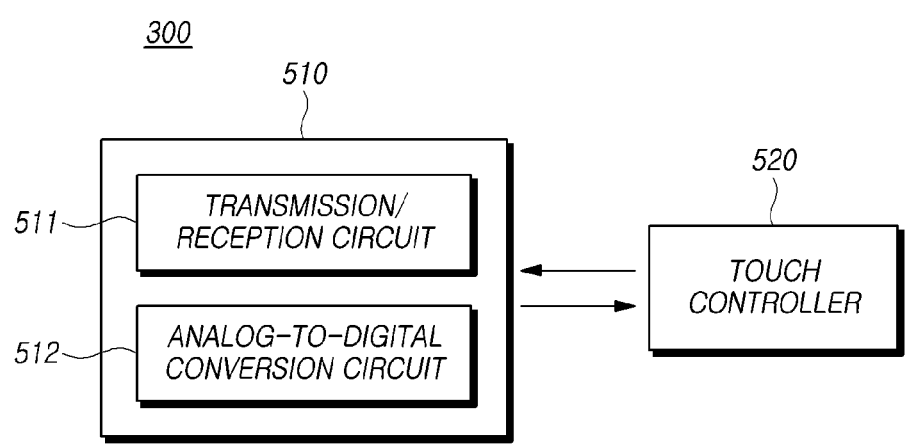
FIG. 5 is a block diagram schematically illustrating a touch circuit of the touch display device according to embodiments of the present disclosure.

FIG. 5 is a block diagram schematically illustrating the touch circuit 300 of the touch display device 10 according to embodiments of the present disclosure.

Referring to FIG. 5, the touch circuit 300 of the touch display device 10 according to embodiments of the present disclosure includes one or more touch driving circuits 510 that drives all or some of the plurality of touch electrodes TE in the touch panel TSP, senses all or some of the plurality of touch electrodes TE, and generates and outputs sensing data and a touch controller 520 that controls the operation of the touch driving circuit 510 and detects a touch input and/or a touch position with a pen 20 or a finger 30 using the sensing data output from the touch driving circuit 510.

The touch driving circuit 510 includes a transmission/reception circuit 511 that supplies various signals to the touch panel TSP and detects various signals from the touch panel TSP and an analog-to-digital converter 512 that generates digital sensing values corresponding to various signals detected by the transmission/reception circuit 511 and supplies sensing data including the digital sensing values to the touch controller 520.

In order to sense a pen touch, in N touch time sections included in each touch frame time, the transmission/reception circuit 511 applies an uplink signal ULS which is to be supplied to one or more pens 20 to all or some of the plurality of touch electrodes TE included in the touch panel TSP and receives a downlink signal DLS output from one or more pens 20 having received the uplink signal ULS via the touch panel TSP via one or more touch electrodes TE. Here, an uplink refers to a path or a channel directed from the touch panel TSP to the pen 20, and a downlink refers to a path or a channel directed from the pen 20 to the touch panel TSP. The analog-to-digital converter 512 generates a digital sensing value in response to the downlink signal DLS.

One or more touch driving circuits 510 included in the touch circuit 300 may be embodied as individual components or as a single component.

The touch driving circuit 510 can be embodied to be incorporated into a unified integrated circuit along with the source drive integrated circuit SDIC for embodying the data driving circuit 120. The unified integrated circuit includes the touch driving circuit 510 and the source driver integrated circuit SDIC.

The unified integrated circuit is of an inner-mounted type in which the touch panel TSP is mounted inside the display panel 110, and can effectively perform touch driving and data driving when the signal lines connected to the touch electrodes TE are arranged parallel to the data lines DL.

Figure 6:
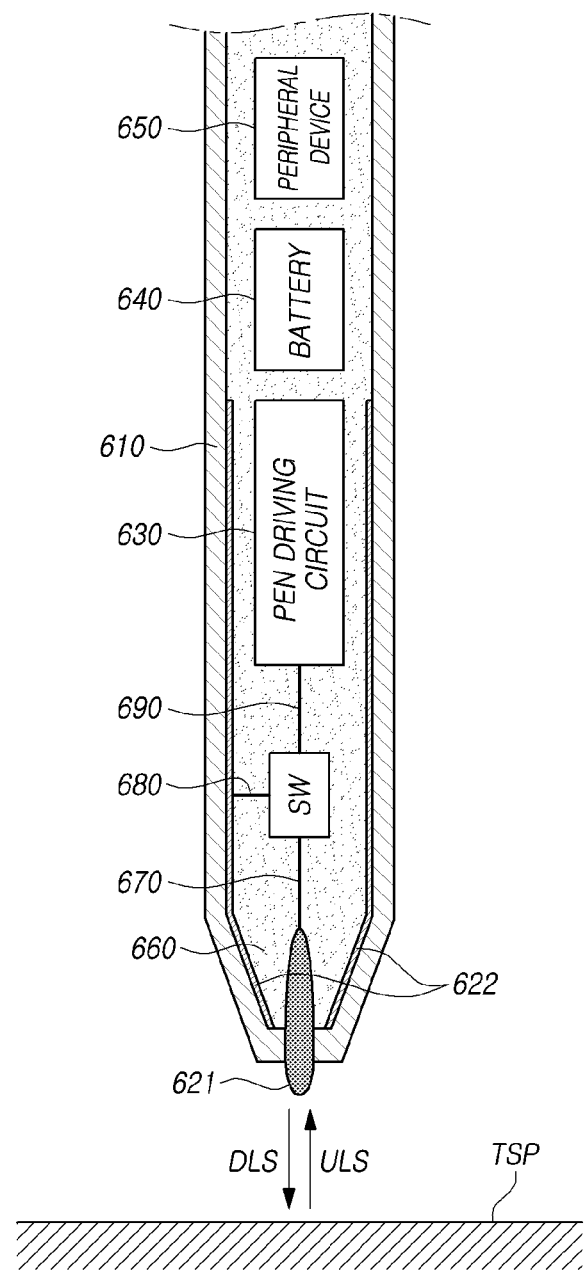
FIG. 6 is a diagram illustrating a configuration of a pen which operates in cooperation with the touch display device according to embodiments of the present disclosure.

FIG. 6 is a diagram illustrating a configuration of a pen 20 which operates in cooperation with the touch display device 10 according to embodiments of the present disclosure.

Referring to FIG. 6, the pen 20 according to embodiments of the present disclosure includes a housing 610 corresponding to a case, a first tip 621 that protrudes outward from the housing 610, a second tip 622 that is provided in the housing 610 and has a shape surrounding the inner side surfaces of the housing 610, a pen driving circuit 630 that is provided in the housing 610 and outputs a downlink signal DLS via the first tip 621 and/or the second tip 622, a battery 640 that supplies electric power, and various peripheral devices 650 such as a button, a communication module, and a display.

The housing 610 serves as an electrical ground.

The first tip 621 serves as a medium (or a transmission antenna) from which a downlink signal DLS is transmitted and the second tip 622 similarly serves as a medium (or a transmission antenna) from which a downlink signal DLS is transmitted.

The second tip 622 does not protrude outward from the housing 610 and thus does not touch the touch panel TSP, but serves to transmit a signal similarly to the first tip 621.

The pen driving circuit 630 is provided in the housing 610, is electrically connected to one or both of the first tip 621 and the second tip 622, and outputs a downlink signal DLS via one or both of the first tip 621 and the second tip 622 or receives an uplink signal ULS via one or both of the first tip 621 and the second tip 622.

The pen driving circuit 630 is electrically connected to one or both of the first tip 621 and the second tip 622 via a switch SW.

The first tip 621 and the switch SW are connected via a tip line 670, and the second tip 622 and the switch SW are connected via a ring line 680. The pen driving circuit 630 and the switch SW are connected via a circuit line 690.

The switch SW selects one or both of the first tip 621 and the second tip 622 and connects the selected one to the pen driving circuit 630.

On the other hand, the first tip 621 and the second tip 622 are formed of conductor and are electrically isolated from each other. Accordingly, an insulating material 660 such as plastic is interposed between the first tip 621 and the second tip 622.

On the other hand, the first tip 621 serves as a medium (or a reception antenna) via which an uplink signal ULS is received and the second tip 622 similarly serves as a medium (or a reception antenna) via which an uplink signal ULS is received.

The second tip 622 may have a shape which is different from the shape of the first tip 621.

The second tip 622 may be a coil which is wound in a spiral shape along the inner side surface of the housing 610. The second tip 622 is also referred to as a ring.

A downlink signal DLS output from the first tip 621 and a downlink signal DLS output from the second tip 622 may have the same signal intensity. On the other hand, a downlink signal DLS output from the first tip 621 and a downlink signal DLS output from the second tip 622 may have different signal intensities.

The pen driving circuit 630 includes a reception unit that receives an uplink signal ULS (for example, a beacon signal or a pin signal) applied to one or more touch electrodes TE disposed in the touch panel TSP via one or both of the first tip 621 and the second tip 622, a transmission unit that transmits a downlink signal DLS via one or both of the first tip 621 and the second tip 622, a control unit that controls a pen driving operation, and a pressure unit that measures a pen pressure.

Figure 7:
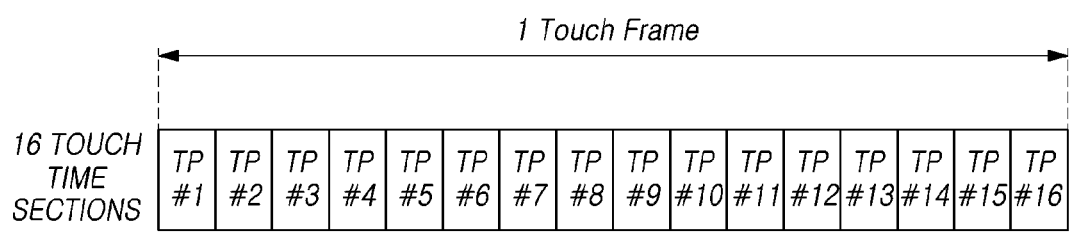
FIG. 7 is a diagram illustrating touch time sections in one touch frame time of the touch display device according to embodiments of the present disclosure.

FIG. 7 is a diagram illustrating touch time sections TP #1 to TP #16 in one touch frame time of the touch display device 10 according to embodiments of the present disclosure.

The touch display device 10 according to embodiments of the present disclosure sets a predetermined touch frame time and repeatedly performs a predetermined operation of sensing a touch for each touch frame time in order to sense a touch with one or more pens 20 and one or more fingers 30. For example, a touch frame time is set to a time required for once sensing the whole area of the touch panel TSP in order to sense a touch and/or a touch position with a finger 30.

Referring to FIG. 7, the touch display device 10 according to embodiments of the present disclosure sets each touch frame time to include N touch time sections TP #1 to TP #16 (N=16), allocates various function time sections for sensing a pen touch and sensing a finger touch (for example, a finger sensing time section, a pen position sensing time section, a pen tilt sensing time section, and pen data transmission time section) to the N touch time sections TP #1 to TP #16 (N=16), and performs a cooperative operation with one or more pens 20 in the N touch time sections TP #1 to TP #16 (N=16) to which various functional time sections are allocated.

The length of each touch frame time is set in consideration of a display frame time. For example, the touch frame time has the same length as the display frame time, has a length which is two times the display frame time, or has a length which is a half of the display frame time.

The number of touch time sections (N) in one touch frame time is equal to or greater than three (N≥3). In the following description, for the purpose of convenience of explanation, the number of touch time sections (N) in one touch frame time is set to 16.

The touch display device 10 according to embodiments of the present disclosure can perform independently or simultaneously driving for sensing a touch (finger touch sensing and pen touch sensing) and driving for display. This is referred to as "simultaneous driving."

Alternatively, the touch display device 10 according to embodiments of the present disclosure may perform driving for sensing a touch (finger touch sensing and pen touch sensing) and driving for display in different time zones. This is referred to as "time-divisional driving."

Figure 8:
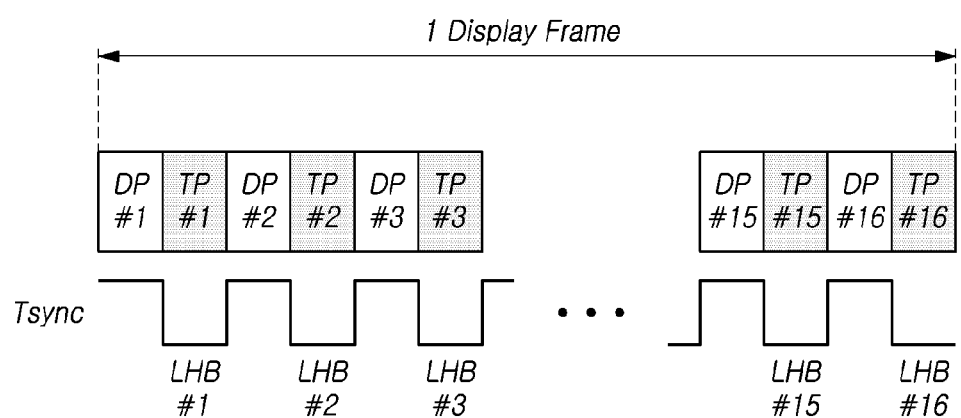
FIG. 8 is a diagram illustrating touch time sections in one touch frame time when the touch display device according to embodiments of the present disclosure operates with a time divisional driving system.

FIG. 8 is a diagram illustrating N touch time sections TP #1 to TP #16 (N=16) in one touch frame time when the touch display device 10 according to embodiments of the present disclosure operates using a time-divisional driving system.

Referring to FIG. 8, each of N touch time sections TP #1 to TP #16 (N=16) in one touch frame time is identified and defined by a touch synchronization signal Tsync. The touch controller 520 supplies a touch synchronization signal Tsync to the touch driving circuit 510 and the touch driving circuit 510 performs a predetermined operation in N touch time sections TP #1 to TP #16 (N=16) which is defined in response to the touch synchronization signal Tsync.

The touch synchronization signal Tsync is a control signal in which a touch level signal section for defining timings of a plurality of touch time sections TP #1 to TP #16 and a non-touch level signal section for defining non-touch sections (for example, display driving time sections) other than the plurality of touch time sections TP #1 to TP #16 are alternately arranged.

For example, as illustrated in FIG. 8, a touch level section is a low-level voltage section and a non-touch level section is a high-level voltage section. On the other hand, the touch level section may be a high-level voltage section and the non-touch level section may be a low-level voltage section.

Referring to FIG. 8, in a time-divisional driving system, the display driving time sections DP #1 to DP #16 and the touch time sections TP #1 to TP #16 progress alternately.

In the time-divisional driving system, one touch frame time is associated with a display frame time. In the time-divisional driving system, one touch frame time is K or 1/K times an update cycle of a display frame (that is, a display frame time). K is an integer which is equal to or greater than 1.

For example, as illustrated in FIG. 8, a touch frame time is the same as the display frame time. On the other hand, the touch frame time may be two or ½ times the display frame time.

Referring to FIG. 8, when all 16 display driving time sections DP #1 to DP #16 included in one display frame time passes, one frame screen (a display frame screen) for the whole area of the display panel 110 is updated.

Accordingly, each of 16 display driving time sections DP #1 to DP #16 included in one display frame time is a time required for driving an area corresponding to 1/16 of a display area of the display panel 110.

In the time-divisional driving system, each of the N touch time sections TP #1 to TP #16 in one display frame time is a blank time. In the time-divisional driving system, each of the N touch time sections TP #1 to TP #16 (N=16) are also referred to as long horizontal blank (LHB) time sections LHB #1 to LHB #16.

Referring to FIG. 8, in the time-divisional driving system, the touch synchronization signal Tsync is a control signal in which a touch level signal section for defining timings of a plurality of touch time sections TP #1 to TP #16 and a non-touch level signal section for defining a plurality of display driving sections DP #1 to DP #16 corresponding to non-touch sections are alternately arranged.

For example, as illustrated in FIG. 8, a touch level section is a low-level voltage section and a non-touch level section is a high-level voltage section. On the other hand, the touch level section may be a high-level voltage section and the non-touch level section may be a low-level voltage section.

Figure 9:
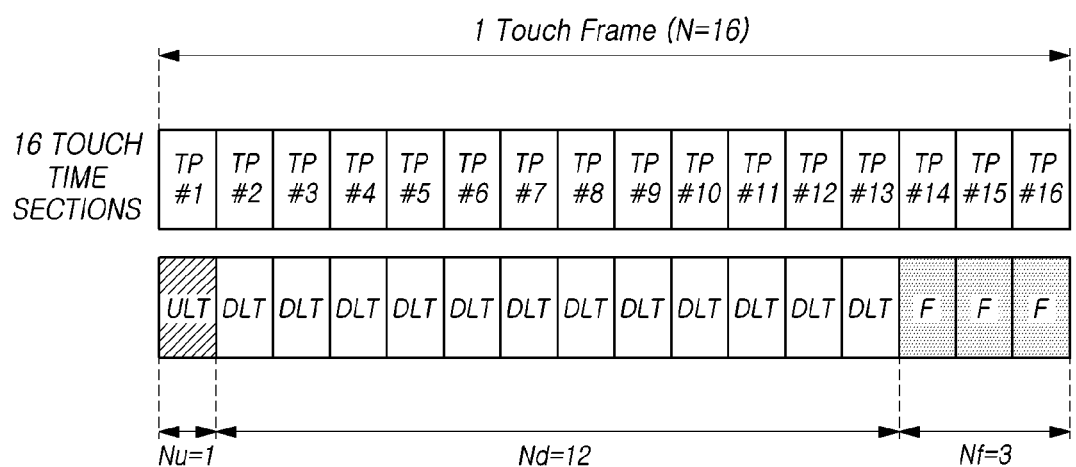
FIG. 9 is a diagram illustrating an exemplary configuration of N touch time sections in one touch frame time of the touch display device according to embodiments of the present disclosure.

FIG. 9 is a diagram illustrating a configuration of N touch time sections TP #1 to TP #16 (N=16) in one touch frame time of the touch display device 10 according to embodiments of the present disclosure.

Referring to FIG. 9, in N touch time sections TP #1 to TP #16 in one touch frame time, the touch circuit 300 of the touch display device 10 senses a pen touch by applying an uplink signal ULS to all or some of the plurality of touch electrodes TE and receiving a downlink signal DLS output from one or more pens 20 having received the uplink signal ULS via the touch panel via one or more touch electrodes TE, and senses a finger touch by applying a touch driving signal to all or some of the plurality of touch electrodes TE and sensing all or some of the plurality of touch electrodes TE.

Referring to FIG. 9, N touch time sections TP #1 to TP #16 (N=16) in one touch frame time include Nu uplink transmission time sections ULT, Nd downlink transmission time sections DLT, and Nf finger sensing time sections F.

The Nu uplink transmission time sections ULT are touch time sections in which an uplink signal ULS in which a voltage level changes irregularly or aperiodically is transmitted from the touch panel TSP to one or more pens 20. A reason why the voltage level of the uplink signal ULS changes irregularly or aperiodically is that pen driving control information is expressed in a voltage level in the uplink signal ULS.

The Nd downlink transmission time sections DLT are touch time sections in which a downlink signal DLS is transmitted from one or more pens 20 to the touch panel TSP. Here, the downlink signal DLS can be used for various applications. The voltage level of the downlink signal DLS may change irregularly or aperiodically depending on applications or the voltage level thereof may change regularly and periodically.

The Nf finger sensing time sections F are touch time sections in which a touch with a finger 30 is sensed.

The sum of the number of uplink transmission time sections ULT Nu, the number of downlink transmission time sections DLT Nd, and the number of finger sensing time sections F Nf is the same as the number of touch time sections TP #1 to TP #16 N (N=Nu+Nd+Nf).

The number of uplink transmission time sections ULT Nu is equal to or greater than one, the number of downlink transmission time sections DLT Nd is equal to or greater than one, and the number of finger sensing time sections F Nf is equal to or greater than one (Nu≥1, Nd≥1, Nf≥1).

In the example illustrated in FIG. 9, N=16, Nu=1, Nd=12, and Nf=3 are set. In this example, out of N touch time sections TP #1 to TP #16 (N=16) in one touch frame time, one (Nu) touch time section TP #1 is allocated as an uplink transmission time section ULT, 12 (Nd) touch time sections TP #2 to TP #13 are allocated as downlink transmission time sections DLT, and three (Nf) touch time sections TP #14 to TP #16 are allocated as finger sensing time sections F.

Figure 10:
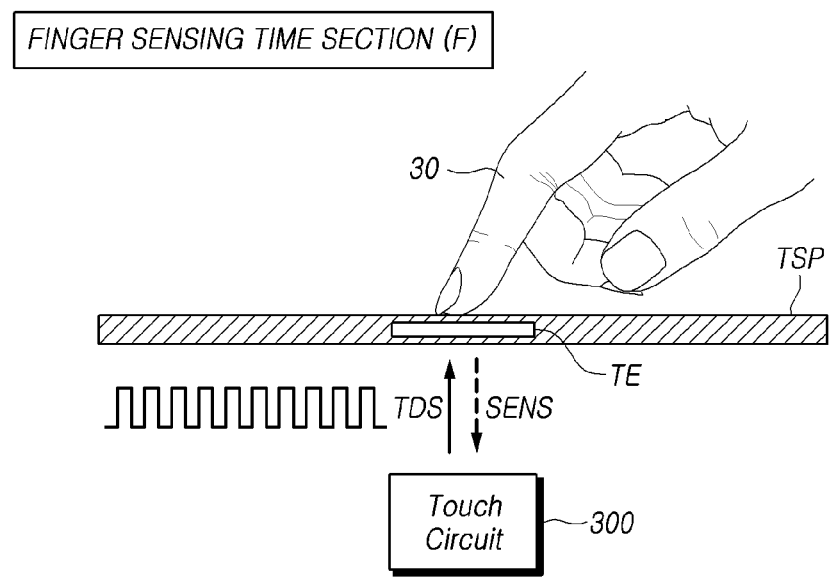
FIG. 10 is a diagram illustrating an operation of the touch display device in touch time sections which are allocated as finger sensing time sections out of N touch time sections in one touch frame time of the touch display device according to embodiments of the present disclosure.

FIG. 10 is a diagram illustrating the operation of the touch display device 10 in the touch time sections TP #14 to TP #16 allocated as the finger sensing time sections F out of the N touch time sections TP #1 to TP #16 (N=16) in one touch frame time of the touch display device 10 according to embodiments of the present disclosure.

Referring to FIG. 10, in the touch time sections TP #14 to TP #16 allocated as the finger sensing time sections F, the touch circuit 300 applies a touch driving signal TDS to one or more touch electrodes TE in the touch panel TSP.

Thereafter, the touch circuit 300 detects a touch sensing signal SENS via all or some of the plurality of touch electrodes TE in the touch panel TSP and senses a self-capacitance between the touch electrode TE and the finger 30 or senses a mutual-capacitance between the touch electrodes TE.

The touch driving signal may be a signal in which a voltage level changes by predetermined amplitude. The frequency of the touch driving signal TDS may be constant or variable.

When the touch driving signal TDS is applied to the touch electrodes TE, a signal (referred to as a load-free driving signal) corresponding to the touch driving signal TDS in one or more of frequency, phase, and amplitude is applied to the near data lines DL, the near gate lines GL, or other touch electrodes TE. Accordingly, it is possible to reduce a parasitic capacitance deteriorating touch sensitivity from being formed between the touch electrodes and surrounding patterns DL, GL, and TE at the time of sensing a finger touch.

On the other hand, when the touch driving signal TDS is applied to one or more touch electrodes TE in the touch panel TSP in the touch time sections TP #14 to TP #16 allocated as the finger sensing time sections F, one or more pens 20 outputs a signal (referred to as a pen load-free driving signal) corresponding to the touch driving signal TDS in frequency and phase to the touch panel TSP.

Figure 11:
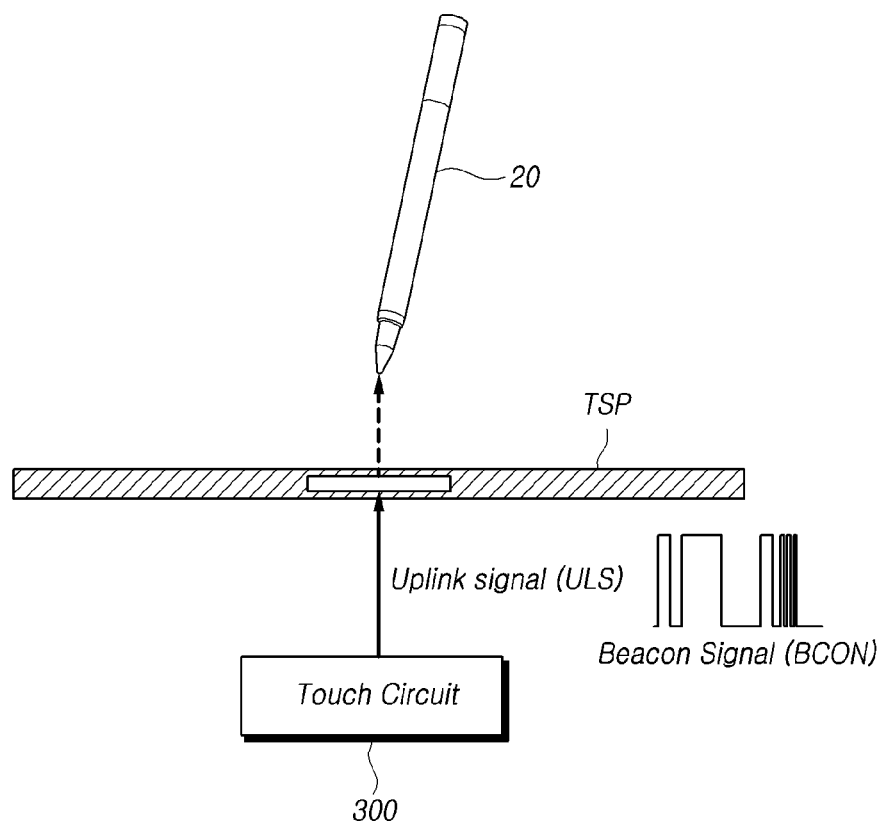
FIG. 11 is a diagram illustrating operations of the touch display device and a pen in touch time sections which are allocated as uplink transmission time sections out of N touch time sections in one touch frame time of the touch display device according to embodiments of the present disclosure.

FIG. 11 is a diagram illustrating the operations of the touch display device 10 and the pen 20 in the touch time section TP #1 allocated as the uplink transmission time sections ULT out of the N touch time sections TP #1 to TP #16 (N=16) in one touch frame time of the touch display device 10 according to embodiments of the present disclosure.

Referring to FIG. 11, in the touch time section TP #1 allocated as the uplink transmission time section ULT, the touch circuit 300 applies an uplink signal ULS to all or some of the plurality of touch electrodes TE in the touch panel TSP.

Accordingly, one or more pens 20 which touch the touch panel TSP or which is close thereto can receive the uplink signal ULS applied to the touch electrodes TE.

The uplink signal ULS can be used to notify a pen 20 which is recognized by the touch display device 10 or an arbitrary pen 20 which is not recognized by the touch display device 10.

When the uplink signal ULS is received, one or more pens 20 can control its own driving operation using various types of information indicated by the uplink signal ULS.

Examples of the pen 20 which is recognized by the touch display device 10 include a pen 20 which has provided its specific pen ID to the touch display device 10, a pen 20 to which the touch display device 10 has given a temporary pen ID, and a pen 20 which has been paired with the touch display device 10.

Examples of the pen 20 which is not recognized by the touch display device 10 include a pen 20 which has not provided its specific pen ID to the touch display device 10, a pen 20 to which the touch display device 10 has not given a temporary pen ID, and a pen 20 which has not been paired with the touch display device 10.

The uplink signal ULS may be, for example, a beacon signal BCON including pen driving control information. In this case, the uplink signal ULS can be referred to a beacon transmission time section.

The beacon signal BCON includes one or more of touch panel type information (for example, an in-cell type or add-on type), touch time section information (LHB information), frequency information of a downlink signal DLS, pulse number information of a downlink signal DLS, number information of touch time sections subsequent to the uplink transmission time section ULT, and driving timing information.

The beacon signal BCON may further include power mode information (for example, touch time section information in which no panel and no pen are driven for the purpose of a decrease in power consumption). The beacon signal BCON may further include information for synchronizing driving of the touch panel TSP and the pen 20.

Various types of information included in the beacon signal BCON are stored in a memory of the touch display device 10. Various types of information stored in the memory may be shared by the pen 20 in advance.

The beacon signal BCON is an information signal indicating various types of information as described above and thus a voltage level can change irregularly or aperiodically. The beacon signal BCON is a significant control signal and has amplitude greater than other signals.

Figure 12:
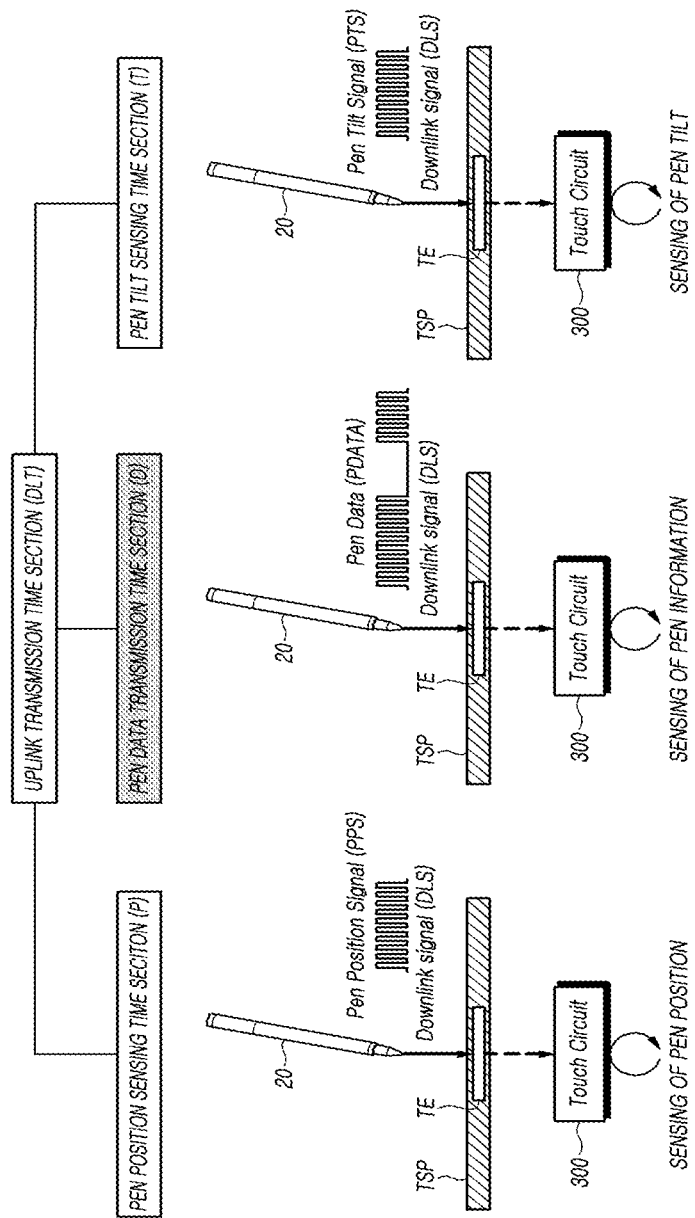
FIG. 12 is a diagram illustrating operations of the touch display device and a pen in touch time sections which are allocated as three types of downlink transmission time sections out of N touch time sections in one touch frame time of the touch display device according to embodiments of the present disclosure.

FIG. 12 is a diagram illustrating operations of the touch display device 10 and a pen 20 in touch time sections TP #2 to TP #13 which are allocated as three types of downlink transmission time sections DLT out of N touch time sections TP #1 to TP #16 (N=16) in one touch frame time of the touch display device 10 according to embodiments of the present disclosure.

When it is mentioned that the touch display device 10 senses a pen touch, it means that the touch display device 10 senses a pen position, a pen tilt, or various types of pen information.

Accordingly, the Nd downlink transmission time sections DLT include a pen position sensing time section P in which a pen position of a pen 20 is sensed, a pen tilt sensing time section T in which a pen tilt of the pen 20 is sensed, and a pen data transmission time section D in which pen information of the pen 20 is sensed.

The downlink signal DLS which is output from the pen 20 in the pen position sensing time section P may be a pen position signal PPS in which a voltage level changes regularly or periodically.

The touch circuit 300 receives the pen position signal PPS output from the pen 20 via one or more touch electrodes TE and senses a pen position.

The downlink signal DLS which is output from the pen 20 in the pen tilt sensing time section T may be a pen tilt signal PTS in which a voltage level changes regularly or periodically.

The touch circuit 300 receives the pen tilt signal PTS output from the pen 20 via one or more touch electrodes TE and senses a pen tilt.

The downlink signal DLS which is output from the pen 20 in the pen data transmission time section D indicates various types of pen information, and thus may be pen data PDATA in which a voltage level may change regularly or periodically or in which a voltage level changes irregularly or aperiodically.

The touch circuit 300 receives the pen data PDATA output from the pen 20 via one or more touch electrodes TE and senses various types of pen information included in the pen data PDATA.

For example, various types of pen information included in the pen data PDATA include one or more of input information (for example, button input information) which is generated by the pen 20, pen driving state information, pen communication state information, pen battery information, and specific pen ID information.

For example, various types of pen information included in the pen data PDATA may be expressed in the form of combination of two or more symbols, and each symbol may have two symbol values corresponding to two signal states, three symbol values corresponding to three signal states, or four or more symbol values corresponding to four or more signal states.

Figure 13:
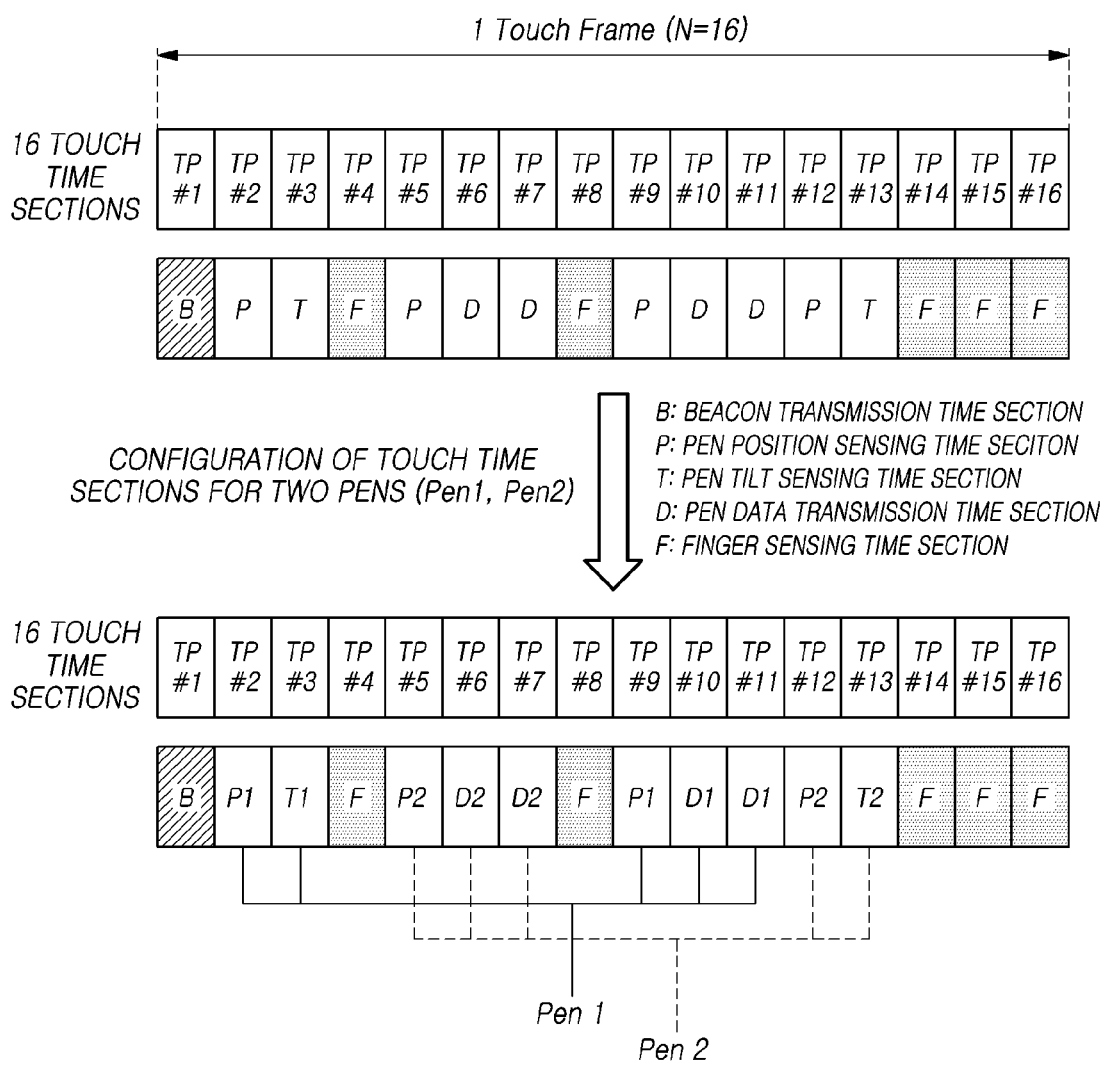
FIG. 13 is a diagram illustrating an exemplary configuration of N touch time sections in one touch frame time such that the touch display device according to embodiments of the present disclosure operate in cooperation with two pens.

FIG. 13 is a diagram illustrating an exemplary configuration of N touch time sections in one touch frame time such that the touch display device according to embodiments of the present disclosure operate in cooperation with two pens;

Referring to FIG. 13, the N touch time sections TP #1 to TP #16 (N=16) are allocated as Nf finger sensing time sections F, Nu uplink transmission time sections ULT, and Nd downlink transmission time sections DLT. That is, N=Nu+Nd+Nf is satisfied.

Referring to FIG. 13, the Nd downlink transmission time sections DLT are allocated as Np pen position sensing time sections P, Nt pen tilt sensing time sections T, and Ni pen data transmission time sections D. That is, Nd=Np+Nt+Ni is satisfied.

For example, as illustrated in FIG. 13, 16 touch time sections TP #1 to TP #16 are allocated as five finger sensing time sections F, one uplink transmission time section ULT, and 10 downlink transmission time sections DLT. Here, one uplink signal ULS is referred to as a beacon transmission time section B.

As illustrated in FIG. 13, the 10 downlink transmission time sections DLT are allocated as four pen position sensing time sections P, two pen tilt sensing time sections T, and four pen data transmission time sections D.

When the number of pens 20 (Pen 1) is one, one beacon transmission time section B and ten downlink transmission time sections DLT are used to sense a pen touch of one pen 20.

When the number of pens 20 (Pen 1 and Pen 2) is two, one beacon transmission time section B is a touch time section TP #1 in which a beacon signal is transmitted to both two pens 20 (Pen 1 and Pen 2).

When the number of pens 20 (Pen 1 and Pen 2) is two, five downlink transmission time sections DLT of ten downlink transmission time sections DLT should be used to sense a pen touch of a first pen (Pen 1) and the remaining five downlink transmission time sections DLT should be used to sense a pen touch of a second pen (Pen 2). Details thereof will be described below.

Out of the ten downlink transmission time sections DLT, four downlink transmission time sections DLT corresponding to four touch time sections TP #2, TP #5, TP #9, and TP #12 are allocated as four pen position sensing time sections P.

Out of the ten downlink transmission time sections DLT, two downlink transmission time sections DLT corresponding to two touch time sections TP #3 and TP #13 are allocated as two pen tilt sensing time sections T.

Out of the ten downlink transmission time sections DLT, four downlink transmission time sections DLT corresponding to four touch time sections TP #6, TP #7, TP #10, and TP #11 are allocated as four pen data transmission time sections D.

Out of the four pen position sensing time sections P, two pen position sensing time sections P1 allocated to the second and ninth touch time sections TP #2 and TP #9 are used to sense a pen position of the first pen (Pen 1) and two pen position sensing time sections P2 allocated to the fifth and twelfth touch time sections TP #5 and TP #12 are used to sense a pen position of the second pen (Pen 2).

Out of the two pen tilt sensing time sections T, the pen tilt sensing time section T1 allocated to the third touch time section TP #3 is used to sense a pen tilt of the first pen (Pen 1) and the pen tilt sensing time section T2 allocated to the thirteenth touch time section TP #13 is used to sense a pen tilt of the second pen (Pen 2).

Out of the four pen data transmission time sections D, two pen data transmission time sections D1 allocated to the tenth and eleventh touch time sections TP #10 and TP #11 are used to sense pen information using pen data PDATA of the first pen (Pen 1) and two pen data transmission time sections D2 allocated to the sixth and seventh touch time sections TP #6 and TP #7 are used to sense pen information using pen data PDATA of the second pen (Pen 2).

When the number of pens 20 is equal to or greater than three, one touch frame time additionally requires pen position sensing time sections P, pen tilt sensing time sections T, and pen data transmission time sections D. When the pen position sensing time sections P, the pen tilt sensing time sections T, and the pen data transmission time sections D are not allocated in one touch frame time, sensing a pen touch for a plurality of pens has to be performed in two or three or more touch frame times and thus a pen touch sensing speed decreases excessively.

Since an amount of pen information included in pen data PDATA is large, at least two touch time sections (pen data transmission time sections D) are required for each pen 20 in one touch frame time. Accordingly, pen touches of three or more pens 20 cannot be sensed using the above touch time section configuration and the above pen touch sensing system.

On the other hand, examples of the touch time section configuration and operations performed and signals ULS and DLS transmitted and received between the touch display device 10 and the pen 20 may be defined in advance as a protocol between the touch display device 10 and the pen 20. This protocol information is shared by the touch circuit 300 of the touch display device 10 and the pen 20.

In an example of a method of sharing various types of protocol information, the touch display device 10 and the pen 20 may store protocol information in advance. In another example of the method of sharing various types of protocol information, when an approach of the pen 20 is sensed, the touch display device 10 can provide all or some of the types of protocol information to the pen 20 and share them with the pen 20.

Figure 14:
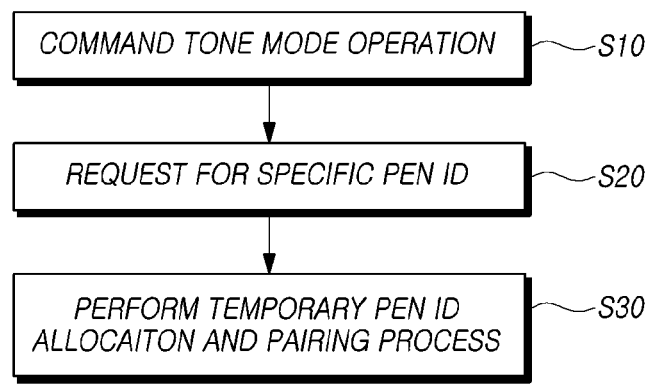
FIG. 14 is a diagram illustrating a method of pairing the touch display device according to embodiments of the present disclosure with a pen.

FIG. 14 is a diagram illustrating a routine of paring the touch display device 10 with a pen 20 according to embodiments of the present disclosure.

Referring to FIG. 14, the touch display device 10 and the pen 20 need to recognize each other for the purpose of cooperative operation between the touch display device 10 and the pen 20, and a routine of pairing the touch display device 10 and the pen 20 is performed. A pairing routine (method) for one pen 20 will be described below for the purpose of convenience of explanation.

The pairing routine includes atone mode operation commanding step S10, a specific pen ID requesting step S20, and a temporary pen ID allocation and pairing processing step S30.

In the tone mode operation commanding step S10, the touch circuit 300 of the touch display device 10 outputs a beacon signal BCON including a tone mode operation command to the touch panel TSP in a beacon transmission time section B.

Accordingly, a pen which has not been recognized by the touch display device 10 and which is close to the touch display device 10 receives the beacon signal BCON including the tone mode operation command.

The tone mode operation command is a command for causing a pen 20 to which a temporary pen ID to be used for sensing a pen touch has not been given to operate in a tone mode. The tone mode is an operation mode in which a pen 20 notifies that it is newly close to the touch display device 10. When a pen 20 operates in the tone mode, the pen 20 can output a driving signal in which a voltage level changes regularly or periodically in all the downlink transmission time sections DLT. When a pen 20 operates in the tone mode, the pen 20 can also output a driving signal in which a voltage level changes regularly or periodically in all the finger sensing time sections F.

In the specific pen ID requesting step S20, the touch circuit 300 of the touch display device 10 outputs a beacon signal BCON for requesting the pen 20 for a specific pen ID to the touch panel TSP in a beacon transmission time section B. The specific pen ID may be a specific ID which has been given by a pen maker at the time of manufacturing the pen 20.

Accordingly, a pen which has not been recognized by the touch display device 10 and which is close to the touch display device 10 receives the beacon signal BCON including information for requesting a specific pen ID in the beacon transmission time section B.

The pen 20 having received the beacon signal BCON including the request information for a specific pen ID outputs its specific pen ID in a downlink transmission time sections DLT. The touch circuit 300 of the touch display device 10 receives the specific pen ID via the touch panel TSP. The specific pen ID output from the pen 20 may have a hash value. Alternatively, the touch circuit may perform a hash process on the specific pen ID (not having a hash value) output from the pen 20 and generate a hash value.

In the temporary pen ID allocation and pairing processing step S30, the touch circuit 300 of the touch display device 10 gives (allocates) a temporary pen ID which is used to sense a pen touch or to recognize a pen 20 during driving to the pen 20 which provides the specific pen ID on the basis of the specific pen ID.

The touch circuit 300 of the touch display device 10 outputs a beacon signal BCON including pairing information including the given temporary pen ID or pairing information including information corresponding to the given temporary pen ID to the touch panel TSP in the beacon transmission time section B.

The pen 20 receives the beacon signal BCON including pairing information in the beacon transmission time section B, recognizes the temporary pen ID or information corresponding thereto, and ends the pairing process. Thereafter, the pen 20 can perform a driving operation using the temporary pen ID or information corresponding thereto.

When two or more pens 20 simultaneously approach the touch display device 10, the touch display device 10 performs the pairing process for the two or more pens 20. At this time, the above tone mode operation commanding step S10 can be simultaneously performed, but the temporary pen ID allocation and pairing processing step S30 should be separately performed for each pen 20.

For example, when a first pen (Pen 1) and a second pen (Pen 2) simultaneously approach in one touch frame time, the tone mode operation commanding step S10 is performed and the specific pen ID requesting step S20 is performed, and then the temporary pen ID allocation and pairing processing step S30 for the first pen (Pen 1) is performed. At this time, the operation of the second pen (Pen 2) stops. After the temporary pen ID allocation and pairing processing step S30 for the first pen (Pen 1) has been performed, the specific pen ID requesting step S20 is performed again. Thereafter, the temporary pen ID allocation and pairing processing step S30 for the second pen (Pen 2) is performed.

Accordingly, when two or more pens 20 simultaneously approach in one touch frame time, it may take much time to complete a pairing process for the two or more pens 20.

Figure 15:
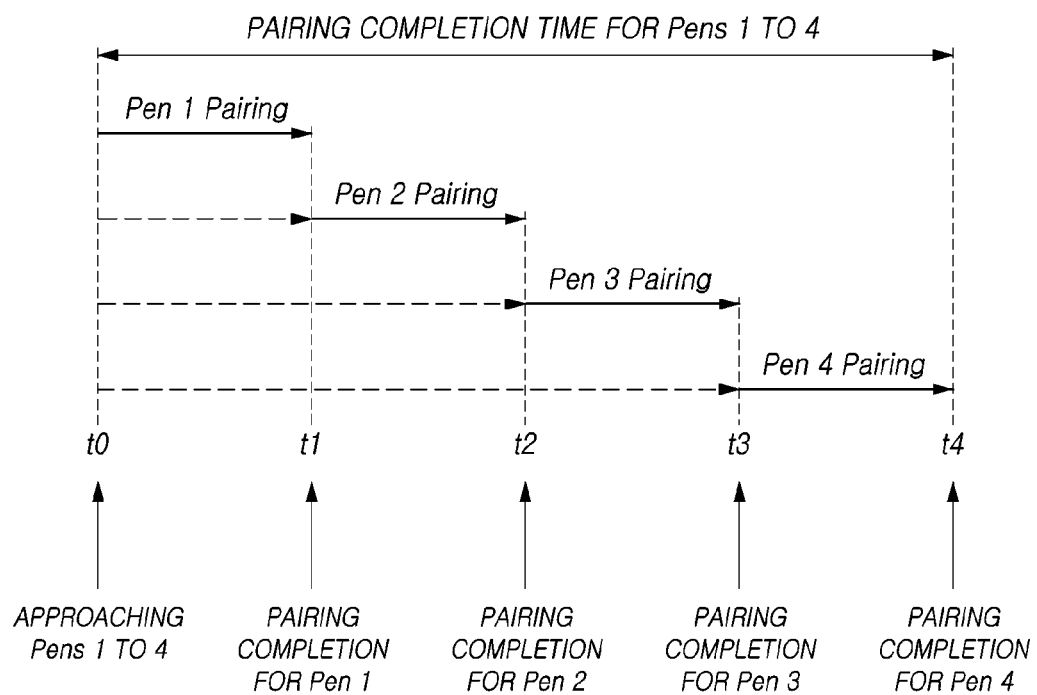
FIG. 15 is a diagram illustrating a routine of pairing the touch display device according to embodiments of the present disclosure with four pens.

FIG. 15 is a diagram illustrating a routine of pairing the touch display device 10 according to embodiments of the present disclosure with four pens 20.

A pairing process for four pens (Pen 1 to Pen 4) when the four pens (Pen 1 to Pen 4) simultaneously approach at time point t0 in one touch frame time will be described below with reference to FIGS. 15 and 14.

First, the tone mode operation commanding step S10 is performed.

Then, the specific pen ID requesting step S20 is performed. Thereafter, the temporary pen ID allocation and pairing processing step S30 for a first pen (Pen 1) is performed and the pairing process for the first pen (Pen 1) is completed at time point t1. At this time, the remaining three pens (Pen 2, Pen 3, and Pen 4) to which a temporary pen ID has not been given stop their operations.

After the pairing process for the first pen (Pen 1) has been completed, the specific pen ID requesting step S20 is performed again. Thereafter, the temporary pen ID allocation and pairing processing step S30 for the second pen (Pen 2) is performed and the pairing process for the second pen (Pen 2) is completed at time point t2. At this time, the remaining two pens (Pen 3 and Pen 4) to which a temporary pen ID has not been given stop their operations.

After the pairing process for the second pen (Pen 2) has been completed, the specific pen ID requesting step S20 is performed again. Thereafter, the temporary pen ID allocation and pairing processing step S30 for the third pen (Pen 3) is performed and the pairing process for the third pen (Pen 3) is completed at time point t3. At this time, the remaining one pen (Pen 4) to which a temporary pen ID has not been given stops its operation.

After the pairing process for the third pen (Pen 3) has been completed, the specific pen ID requesting step S20 is performed again. Thereafter, the temporary pen ID allocation and pairing processing step S30 for the fourth pen (Pen 4) is performed and the pairing process for the fourth pen (Pen 4) is completed at time point t4.

Through the above-mentioned routine, the pairing processes for the four pens (Pen 1 to Pen 4) which has simultaneously approached at time point t0 are all completed at time point t4. With the above pairing routine, it can be seen that it takes considerably much time to complete all the pairing processes for the four pens (Pen 1 to Pen 4). This is because the number of touch time sections for increasing a pairing speed for many pens 20 is not sufficient in one touch frame time in addition to a problem of the pairing process making rapid pairing difficult.

A method of enabling a pen touch sensing operation for more than two pens 20 in one touch frame time and a rapid pairing process will be described below.

Figure 16:
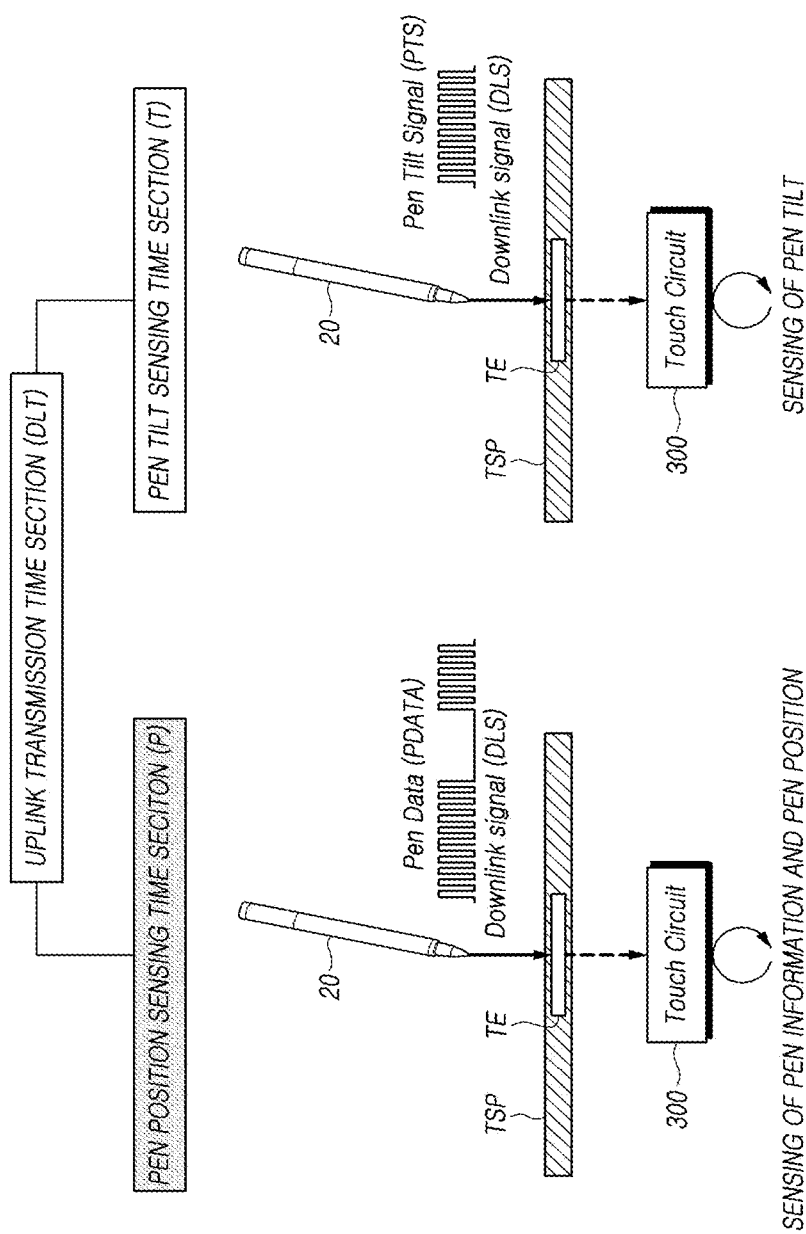
FIG. 16 is a diagram illustrating operations of the touch display device and a pen in two types of downlink transmission time sections such that the touch display device according to embodiments of the present disclosure operate in cooperation with greater than two pens.
Figure 17:
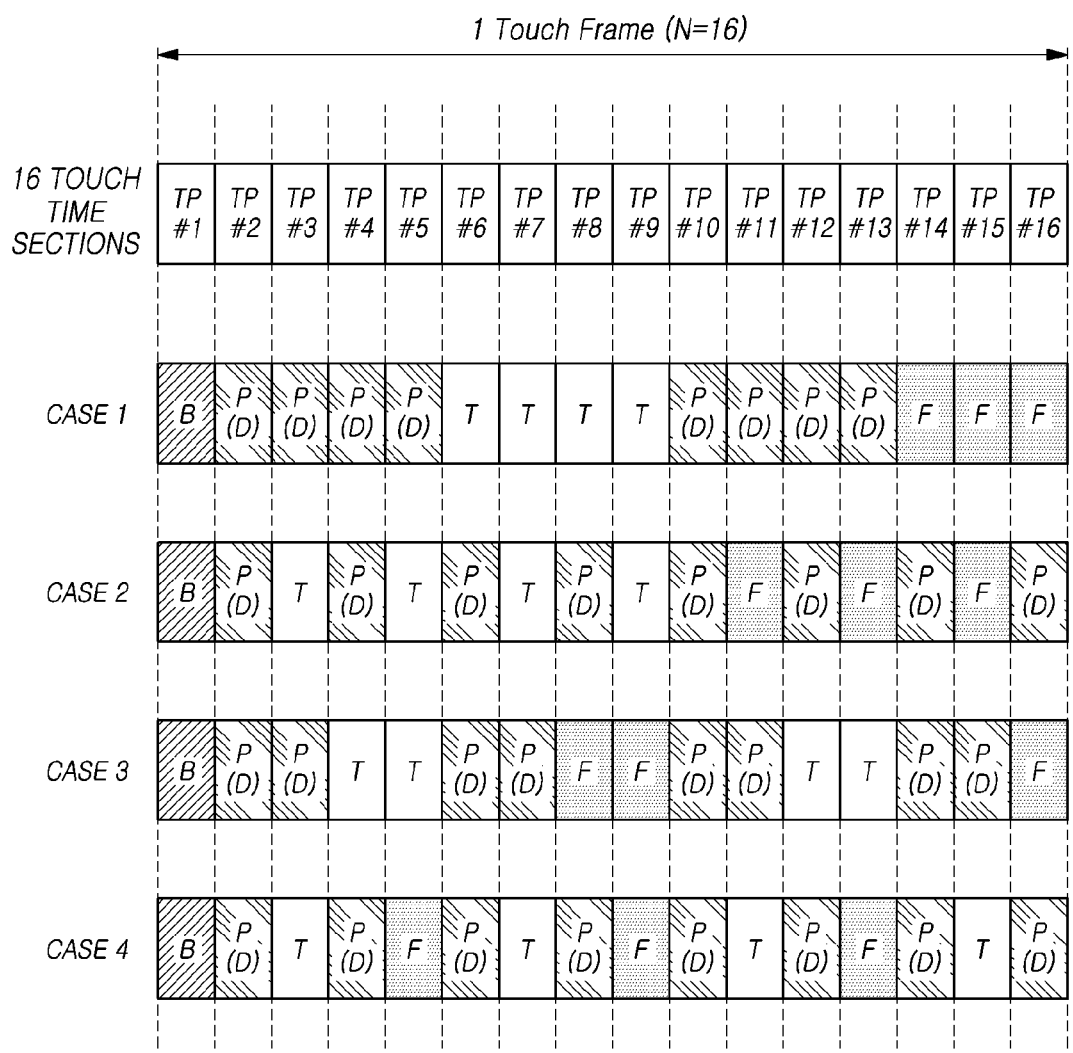
FIGS. 17 to 19 illustrate examples of an extendable configuration of touch time sections of the touch display device according to embodiments of the present disclosure.
Figure 18:
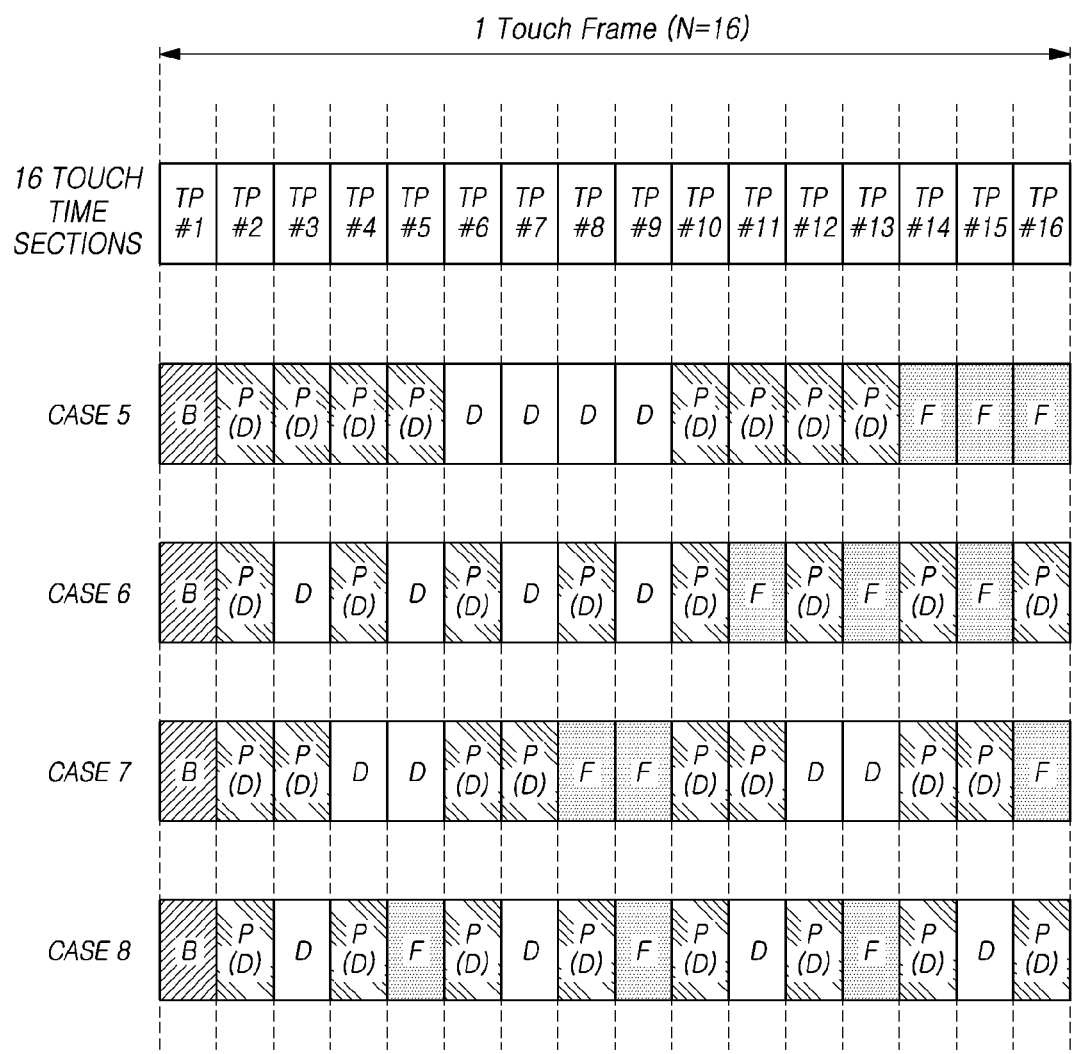
Figure 19:
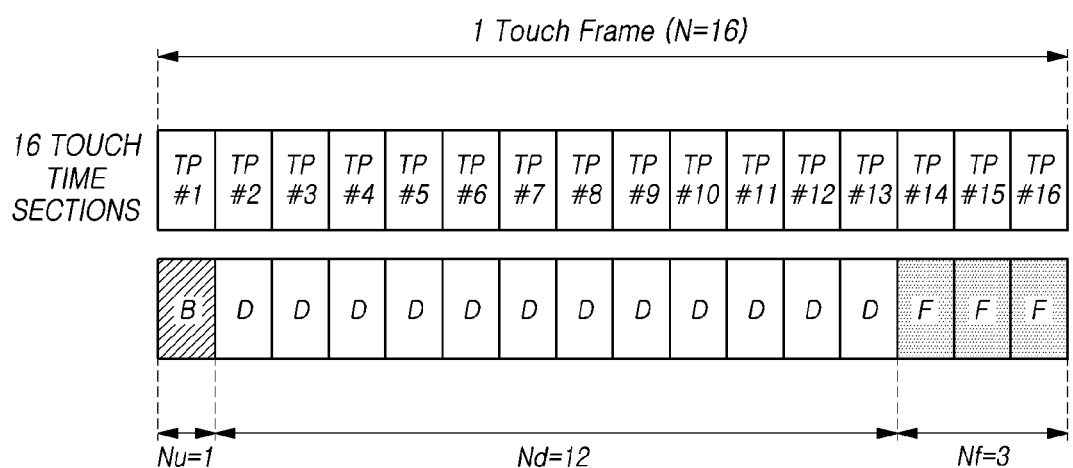

FIG. 16 is a diagram illustrating operations of the touch display device 10 and greater than two pens in two types of downlink transmission time sections DLT such that the touch display device 10 according to embodiments of the present disclosure operates in cooperation with the pens 20. FIGS. 17 to 19 illustrate examples of an extendable configuration of touch time sections of the touch display device 10 according to embodiments of the present disclosure.

The touch display device 10 according to embodiments of the present disclosure includes a touch panel in which a plurality of touch electrodes TE are arranged and a touch circuit 300 that applies an uplink signal ULS to all or some of the plurality of touch electrodes TE in N touch time sections TP #1 to TP #16 (N=16) included in each touch frame time and receives a downlink signal DLS output from one or more pens 20 having received the uplink signal ULS via the touch panel TSP via one or more touch electrodes TE.

The N touch time sections TP #1 to TP #16 (N=16) include Nu uplink transmission time sections ULT in which the uplink signal ULS in which a voltage level changes regularly is transmitted from the touch panel TSP to the one or more pens 20, Nd downlink transmission time sections DLT in which the downlink signal DLS is transmitted from the one or more pens 20 to the touch panel TSP, and Nf finger sensing time sections F in which a touch of a finger 30 is sensed. Nu≥1, Nd≥1, and Nf≥1 are satisfied.

The Nd downlink transmission time sections DLT includes Np pen position sensing time sections P. 1≤Np≤Nd is satisfied.

When the number of pens which are to be sensed in one touch frame time is m, the number of downlink transmission time sections DLT in one touch frame time is equal to or greater than 3×m.

The touch circuit 300 receives pen data PDATA which is a downlink signal DLS output from the one or more pens 20 and in which a voltage level changes irregularly or aperiodically via one or more touch electrodes TE out of the plurality of touch electrodes TE in the Np pen position sensing time sections P, and simultaneously senses pen information and a pen position of the one or more pens 20 on the basis of the pen data PDATA.

At least two touch time sections (that is, two pen position sensing time sections P) are required to transmit pen data PDATA representing pen information for one pen 20.

The pen data PDATA is data including various types of pen information. Various types of pen information included in the pen data PDATA includes, for example, one or more of input information (for example, button input information) which is generated by the pen 20, pen driving state information, pen communication state information, pen battery information, and specific pen ID information.

For example, various types of pen information included in the pen data PDATA may be expressed in the form of combination of two or more symbols, and each symbol may have two symbol values corresponding to two signal states, three symbol values corresponding to three signal states, or four or more symbol values corresponding to four or more signal states.

The touch circuit 300 of the touch display device 10 includes a transmission/reception circuit 511 that applies an uplink signal ULS to all or some of the plurality of touch electrodes TE in the touch panel TSP and receives a downlink signal DLS output from one or more pens 20 having received the uplink signal ULS via the touch panel TSP via one or more touch electrodes TE in N touch time sections TP #1 to TP #16 (N=16) included in each touch frame time and an analog-to-digital conversion circuit 512 that generates a digital sensing value for the downlink signal DLS.

The N touch time sections TP #1 to TP #16 (N=16) includes Nu uplink transmission time sections ULT in which the uplink signal ULS in which a voltage level changes regularly is transmitted from the touch panel TSP to the one or more pens 20, Nd downlink transmission time sections DLT in which the downlink signal DLS is transmitted from the one or more pens 20 to the touch panel TSP, and Nf finger sensing time sections F in which a touch of a finger 30 is sensed.

The Nd downlink transmission time sections DLT include Np pen position sensing time sections P. Nu≥1, Nd≥1, Nf≥1, and 1≤Np≤Nd are satisfied.

The transmission/reception circuit 511 receives pen data PDATA which is a downlink signal DLS output from one or more pens 20 and in which a voltage level changes irregularly or aperiodically via one or more touch electrodes TE of the plurality of touch electrodes TE in the Np pen position sensing time sections P and generates and outputs sensing data for simultaneously sensing pen information and a pen position of the one or more pens 20 on the basis of the pen data PDATA.

The touch circuit 300 applies a beacon signal BCON which is an uplink signal ULS transmitted to the one or more pens 20 and in which pen driving control information is expressed by change of a voltage level to all or some of the plurality of touch electrodes TE in the beacon transmission time section B corresponding to each uplink transmission time sections ULT, and a signal waveform of the downlink signal DLS which his output from the one or more pens 20 in each downlink transmission time sections DLT can vary depending on the beacon signal BCON.

Referring to four cases (CASE 1 to CASE 4) with the touch time section configuration illustrated in FIG. 17, the Nd downlink transmission time sections DLT include Nt pen tilt sensing time sections T in which a pen tilt is sensed and Np pen position sensing time sections P in which a pen position and various types of pen information are simultaneously sensed using the pen data PDATA.

The number of downlink transmission time sections DLT Nd is equal to the sum of the number of pen position sensing time sections P Np, and the number of pen tilt sensing time sections T Nt (Np+Nt=Nd). In four cases (CASE 1 to CASE 4) with the touch time section configuration illustrated in FIG. 17, Nd is 12, Np is 8, and Nt is 4.

The type of the tip via which a downlink signal DLS is output from the pen 20 may differ in the Nt pen tilt sensing time sections T and the Np pen position sensing time sections P.

For example, the tip via which a downlink signal DLS is output from the pen 20 in the Nt pen tilt sensing time sections T is a second tip 622 having a ring shape (a coil shape). The tip via which a downlink signal DLS is output from the pen 20 in the Np pen position sensing time sections P is a first tip 621 having a rod shape.

The signal waveform of the downlink signal DLS which is output from the pen 20 may differ in the Nt pen tilt sensing time sections T and the Np pen position sensing time sections P.

For example, the downlink signal DLS which his output from the pen 20 in the Nt pen tilt sensing time sections T is a pen tilt signal PTS in which a voltage level changes regularly or periodically. The downlink signal DLS which is output from the pen 20 in the Np pen position sensing time sections P is pen data PDATA in which a voltage level changes irregularly or aperiodically.

Referring to FIG. 16, the touch circuit 300 receives pen data PDATA which is a downlink signal DLS output from the first tip 621 of the pen 20 and in which a voltage level changes irregularly or aperiodically via one or more touch electrodes TE in the pen position sensing time sections P and simultaneously senses pen information and a pen position of the pen 20.

Referring to FIG. 16, the touch circuit 300 receives a pen tilt signal PTS which is a downlink signal output from the second tip 622 having a shape different from the first tip 621 of the pen 20 and in which a voltage level changes regularly or periodically via one or more touch electrodes TE in the pen tilt sensing time sections T and senses a pen tilt of the pen 20 on the basis of the pen tilt signal PTS.

Referring to four cases (CASE 1 to CASE 4) with the touch time section configuration illustrated in FIG. 17, when the above touch time section configuration is kept and a method of simultaneously sensing pen information and a pen position using the pen data PDATA in the pen position sensing time sections P is employed, the beacon transmission time sections B which are the Nu uplink transmission time sections ULT, the Np pen position sensing time sections P, the Nt pen tilt sensing time sections T, and the Nf finger sensing time sections F can be allocated to the N touch time sections TP #1 to TP #16 (N=16) in one touch frame time while variously changing the allocation positions.

For example, the allocation positions of the functional time sections B, P, T, and F can be changed depending on the number of pens. For example, the touch time section configuration in CASE 1 and CASE 2 is suitable for a 4-pen mode in which the number of pens is four, the touch time section configuration in CASE 3 is suitable for a 2-pen mode in which the number of pens is two, and the touch time section configuration in CASE 4 is suitable for a 1-pen mode in which the number of pens is one. The present disclosure is not limited thereto.

Referring to four cases (CASE 5 to CASE 8) with the touch time section configuration illustrated in FIG. 18, the Nd downlink transmission time sections DLT include Ni pen data transmission time sections D in which various types of pen information (such as a specific pen ID) can be sensed using the pen data PDATA and Np pen position sensing time sections P in which a pen position and various types of pen information (such as a specific pen ID) can be simultaneously sensed using the pen data PDATA.

The number of downlink transmission time sections DLT Nd is the same as the sum of the number of pen position sensing time sections P NP and the number of pen data transmission time sections D Ni (Np+Ni=Nd). In four cases (CASE 5 to CASE 8) with the touch time section configuration illustrated in FIG. 18, Nd is 12, Np is 8, and Ni is 4.

In the Ni pen data transmission time sections D and the NP pen position sensing time sections P, the type of the tip via which the downlink signal DLS is output from the pen 20 is the same.

Four cases (CASE 1 to CASE 4) with the touch time section configuration illustrated in FIG. 17 in which the Nt pen tilt sensing time sections T are used as the Ni pen data transmission time sections D are the same as four cases (CASE 5 to CASE 8) with the touch time section configuration illustrated in FIG. 18.

With the touch time section configuration of FIG. 17 which is presented to sense pen touches of more pens 20, the number of touch time sections which are allocated for one pen 20 cannot help decreasing. Accordingly, with the touch time section configuration of FIG. 17, the pen position sensing time sections P in which pen data PDATA including pen information such as a specific pen ID with a large amount of information such as about 52 bits is transmitted may not be sufficient.

As illustrated in FIG. 18, by using the touch time sections which are used as the Nt pen tilt sensing time sections T in the touch time section configuration of FIG. 17 as the Ni pen data transmission time sections D, the pen data PDATA including a specific pen ID can be transmitted from the pen 20 to the touch display device 10 in the Ni pen data transmission time sections D in FIG. 18.

Referring to FIG. 18, the pen data PDATA including a specific pen ID can be transmitted from the pen 20 to the touch display device 10 in the Np pen position sensing time sections P. For example, in the Np pen position sensing time sections P, a pen position can also be simultaneously sensed using the pen data PDATA including a specific pen ID.

In other words, four cases (CASE 5 to CASE 8) with the touch time section configuration illustrated in FIG. 18 can be applied when the touch display device 10 requests the pen 20 for a specific pen ID and receives the specific pen ID in the pairing routine described above with reference to FIGS. 14 and 15.

The tip via which a downlink signal DLS is output from the pen 20 in the Ni pen data transmission time sections D and the tip via which a downlink signal DLS is output from the pen 20 in the Np pen position sensing time sections P are both the first tip 621.

Referring to FIG. 16, in the pen position sensing time sections P, the touch circuit 300 can receive pen data PDATA which is a downlink signal DLS output from the first tip 621 of the pen 20 and in which a voltage level changes irregularly or aperiodically via one or more touch electrodes TE, and simultaneously sense pen information and a pen position of one or more pens 20 on the basis of the pen data PDATA.

With the touch time section configuration of FIG. 18, in the pen data transmission time sections D, the touch circuit 300 can receive other pen data PDATA which is a downlink signal DLS output from the first tip 621 of the pen 20 and in which a voltage level changes irregularly or aperiodically via one or more touch electrodes TE, and simultaneously sense other pen information of the pen 20 on the basis of the other pen data PDATA. Here, the other pen data PDATA includes, for example, a specific pen ID Of the pen 20.

Referring to four cases (CASE 5 to CASE 8) with the touch time section configuration illustrated in FIG. 18, when the above touch time section configuration is kept and a method of simultaneously sensing pen information and a pen position using the pen data PDATA in the pen position sensing time sections P is employed, the beacon transmission time sections B which are the Nu uplink transmission time sections ULT, the Np pen position sensing time sections P, the Nt pen tilt sensing time sections T, and the Nf finger sensing time sections F can be allocated to the N touch time sections TP #1 to TP #16 (N=16) in one touch frame time while variously changing the allocation positions.

For example, the allocation positions of the functional time sections B, P, T, and F can be changed depending on the number of pens. For example, the touch time section configuration in CASE 5 and CASE 6 is suitable for a 4-pen mode in which the number of pens is four, the touch time section configuration in CASE 7 is suitable for a 2-pen mode in which the number of pens is two, and the touch time section configuration in CASE 8 is suitable for a 1-pen mode in which the number of pens is one. The present disclosure is not limited thereto.

In four cases (CASE 5 to CASE 8) with the touch time section configuration illustrated in FIG. 18, the touch circuit 300 senses the pen position from the pen data PDATA in the Np pen position sensing time sections P, and also senses various types of pen information using the pen data PDATA. Accordingly, the Np pen position sensing time sections P may be considered as the Np pen data transmission time sections D.

In this consideration, the number of touch time sections in which various types of pen information can be sensed using the pen data PDATA in one touch frame time is the same as a value (12) obtained by summing Np (8) and Ni (4), that is, the number of downlink transmission time sections DLT Nd (12).

In this way, when the Nd downlink transmission time sections DLT in one touch frame time are allocated as the pen data transmission time sections D, the same touch time section configuration as illustrated in FIG. 19 is obtained.

Figure 20:
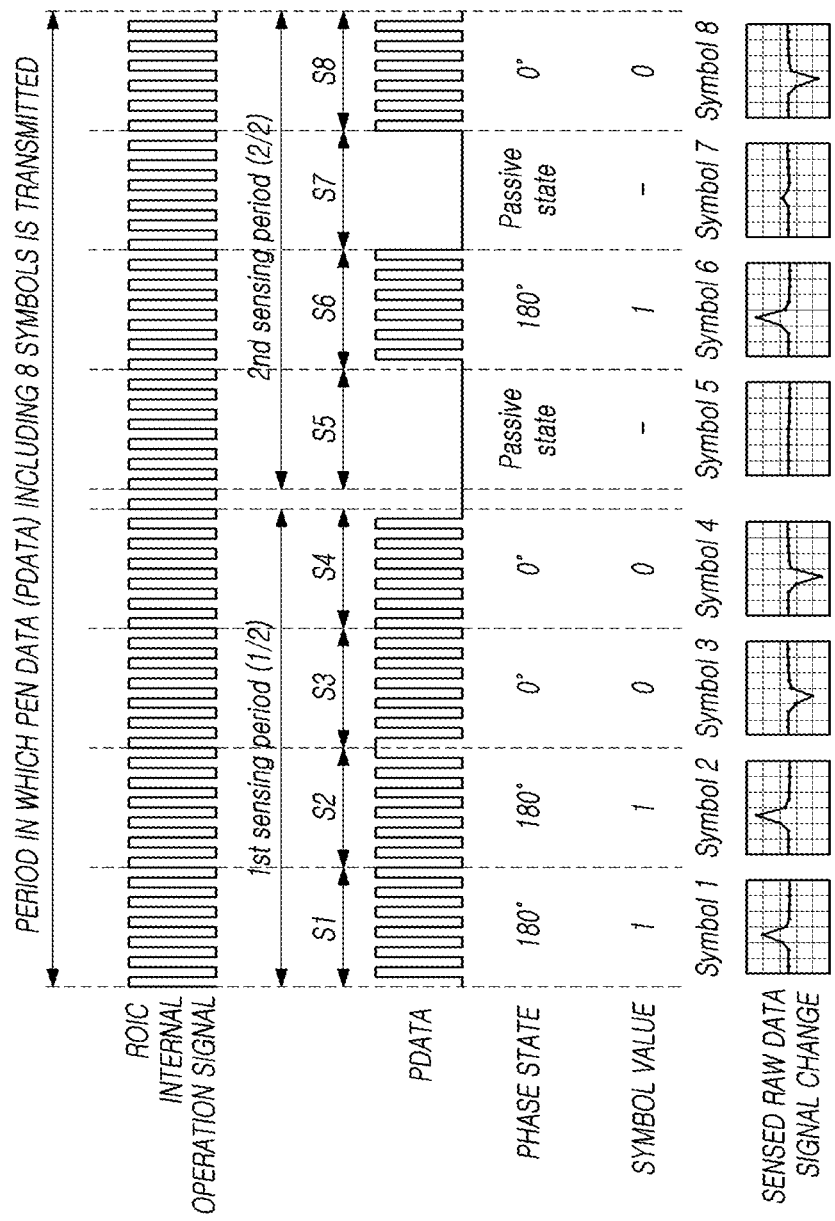
FIG. 20 is a diagram illustrating a method of sensing pen information and a pen position using pen data in two pen position sensing time sections in the touch display device according to embodiments of the present disclosure.

FIG. 20 is a diagram illustrating a method of simultaneously sensing pen information and a pen position using pen data PDATA in two pen position sensing time sections P in the touch display device 10 according to embodiments of the present disclosure.

Referring to FIG. 20, a period in which pend data PDATA including a plurality of symbols is transmitted includes a first sensing period (1/2) and a second sensing period (2/2).

Each of the first sensing period (1/2) and the second sensing period (2/2) corresponds to one pen position sensing time section P.

For example, the first sensing period (1/2) is a pen position sensing time section P which is allocated as the second touch time section TP #2 in CASE 1 of FIG. 17, and the second sensing period (2/2) is a pen position sensing time section P which is allocated as the tenth touch time section TP #10 in CASE 1 of FIG. 17.

For example, various types of pen information included in the pen data PDATA include one or more of input information (for example, button input information) which is generated by the pen 20, pen driving state information, pen communication state information, pen battery information, and specific pen ID information.

For example, various types of pen information included in the pen data PDATA may be expressed in the form of combination of two or more symbols, and each symbol may have two symbol values corresponding to two signal states, three symbol values corresponding to three signal states, or four or more symbol values corresponding to four or more signal states.

Two signal states and three signal states refer to states of pulses in the pen data PDATA.

The two signal states may include a forward-phase state (0°) in which pulses in the pen data PDATA have the same phase as pulses of an internal operation signal of a readout integrated circuit ROIC and a reverse-phase state (180°) in which pulses in the pen data PDATA have a reverse phase of pulses of the internal operation signal of the readout integrated circuit ROIC. Here, the readout integrated circuit ROIC is an integrated circuit constituting a touch driving circuit 510.

The three signal states may include a passive state in addition to the forward-phase state (0°) and the reverse-phase state (180°). The passive state is a state in which the pen data PDATA has a DC voltage or no signals are output from the pen 20.

When the pulses of the pen data PDATA are in the forward-phase state (0°), a symbol indicated by the pulses of the pen data PDATA is "0 (zero)." When the pulses of the pen data PDATA are in the reverse-phase state (180°), a symbol indicated by the pulses of the pen data PDATA is "1." When the pulses of the pen data PDATA are in the passive state, a symbol indicated by the pulses of the pen data PDATA is "-" or null.

Referring to FIG. 20, the pen data PDATA which is received via one or more touch electrodes TE by the touch circuit 300 in the Np pen position sensing time sections P includes a plurality of pulses.

Referring to FIG. 20, the pen data PDATA includes eight sections S1 to S8 in which eight symbols Symbol 1 to Symbol 8 corresponding to pen information are represented.

Each of eight sections S1 to S8 may include pulses (a forward-phase state section and a reverse-phase state section), have a DC voltage with no pulses, or be in a floating state (a passive state section).

The first to fourth sections S1 to S4 out of the eight sections S1 to S8 correspond to the first sensing period (1/2) and the fifth to eight sections S5 to S8 correspond to the second sensing period (2/2).

When the phase state switches (forward-phase state→reverse-phase state, reverse-phase state→forward-phase state), a high-level section of a pulse is maintained or a low-level section of the pulse is maintained.

Accordingly, the high-level section of at least one pulse out of a plurality of pulses included in the pen data PDATA is longer than the high-level section of other pulses.

Alternatively, the low-level section of at least one pulse out of a plurality of pulses included in the pen data PDATA is longer than the low-level section of other pulses.

A plurality of pulses included in the pen data PDATA are divided into a plurality of sections S1 to S8. That is, the pen data PDATA includes a plurality of sections S1 to S8.

The plurality of sections S1 to S8 represent a plurality of symbols Symbol 1 to Symbol 8 corresponding to pen information using pulses.

The plurality of sections S1 to S8 include two sections including pulses. The two sections may include pulses of the same phase or may include pulses of opposite phases.

For example, in a first section S1 including pulses in a reverse-phase state and a second section S2 including pulses in a reverse-phase state, the pulses of the first section S1 and the pulses of the second section S2 have the same phase.

For example, in a third section S3 including pulses in a forward-phase state and a fourth section S4 including pulses in a forward-phase state, the pulses of the third section S3 and the pulses of the fourth section S4 have the same phase.

For example, in the second section S2 including pulses in the reverse-phase state and the third section S3 including pulses in the forward-phase state, the pulses of the second section S2 and the pulses of the third section S3 have opposite phases.

In other words, one of two sections includes pulses (pulses in the forward-phase state) having the same phase as a driving signal which is applied from the touch circuit 300 to the touch panel TSP and in which a voltage level changes regularly or periodically, and the other of the two sections includes pulses (pulses in the reverse-phase state) having a phase opposite to that of the driving signal. For example, the driving signal which is applied from the touch circuit 300 to the touch panel TSP and in which a voltage level changes regularly or periodically may be a touch driving signal TDS in a finger sensing time section F and may be a signal which is synchronized in frequency and phase with an internal operation signal of the touch driving circuit 510 which is constituted by a readout integrated circuit ROIC.

The plurality of sections S1 to S8 includes passive-state sections S5 and S7 which has a DC voltage or which is floating electrically.

As described above, pen data PDATA may have two states including the forward-phase state and the reverse-phase state or three states including the passive state in addition to the two states depending on a phase state. Alternatively, the pen data PDATA may further include one or more additional states by partitioning a voltage level. For example, the forward-phase state may be divided into a first forward-phase state in which the voltage level is equal to or greater than a threshold voltage level and a second forward-phase state in which the voltage level is less than the threshold voltage level depending on the voltage level. The reverse-phase state may be divided into a first reverse-phase state in which the voltage level is equal to or greater than a threshold voltage level and a second reverse-phase state in which the voltage level is less than the threshold voltage level depending on the voltage level.

Referring to FIG. 20, the touch circuit 300 receives pulses of the pen data PDATA via one or more touch electrodes TE which are touched by the pen 20 or close thereto and generates sensing raw data corresponding to a digital sensing value.

Referring to FIG. 20, the sensing raw data of pulses of pen data PDATA in the forward-phase state (0°) has a negative value. The sensing raw data of pulses of the pen data PDATA in the reverse-phase state (180°) has a positive value. The sensing raw data for pulses of the pen data PDATA in the passive state has 0 (zero) or a value close thereto.

When the sensing raw data has a negative value or a positive value, it means that the touch electrode for which pen data PDATA is input is touched by the pen 20 or close thereto.

Accordingly, the touch circuit 300 can sense a pen position using the sensing raw data for pulses in states (the forward-phase state and the reverse-phase state) other than the passive state in the pen data PDATA. That is, the touch circuit 300 can sense pen information and a pen position using the pen data PDATA which is received in the Np pen position sensing time sections P.

Figure 21A:
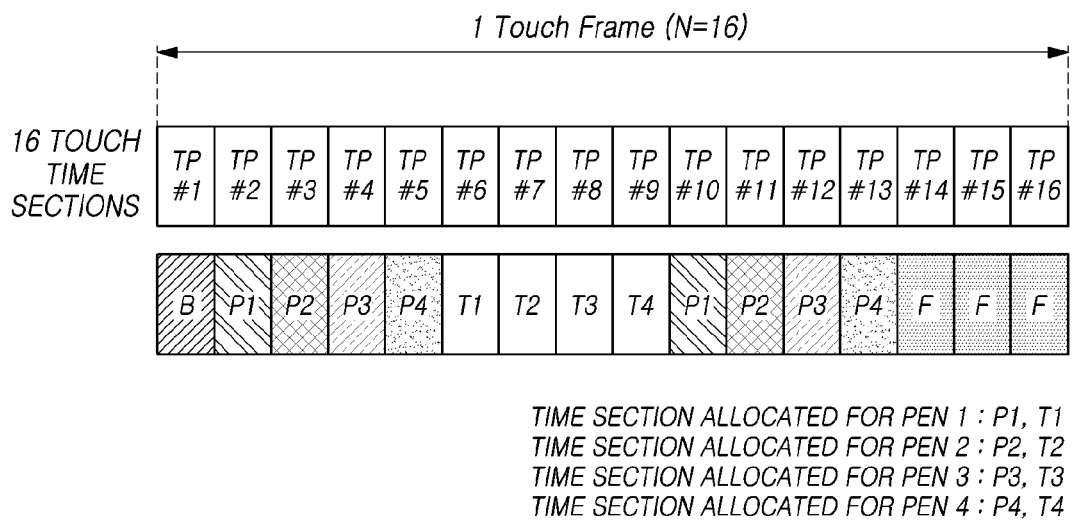
FIG. 21A is a diagram illustrating a configuration of touch time sections for a 4-pen mode in the touch display device according to embodiments of the present disclosure.
Figure 21B:
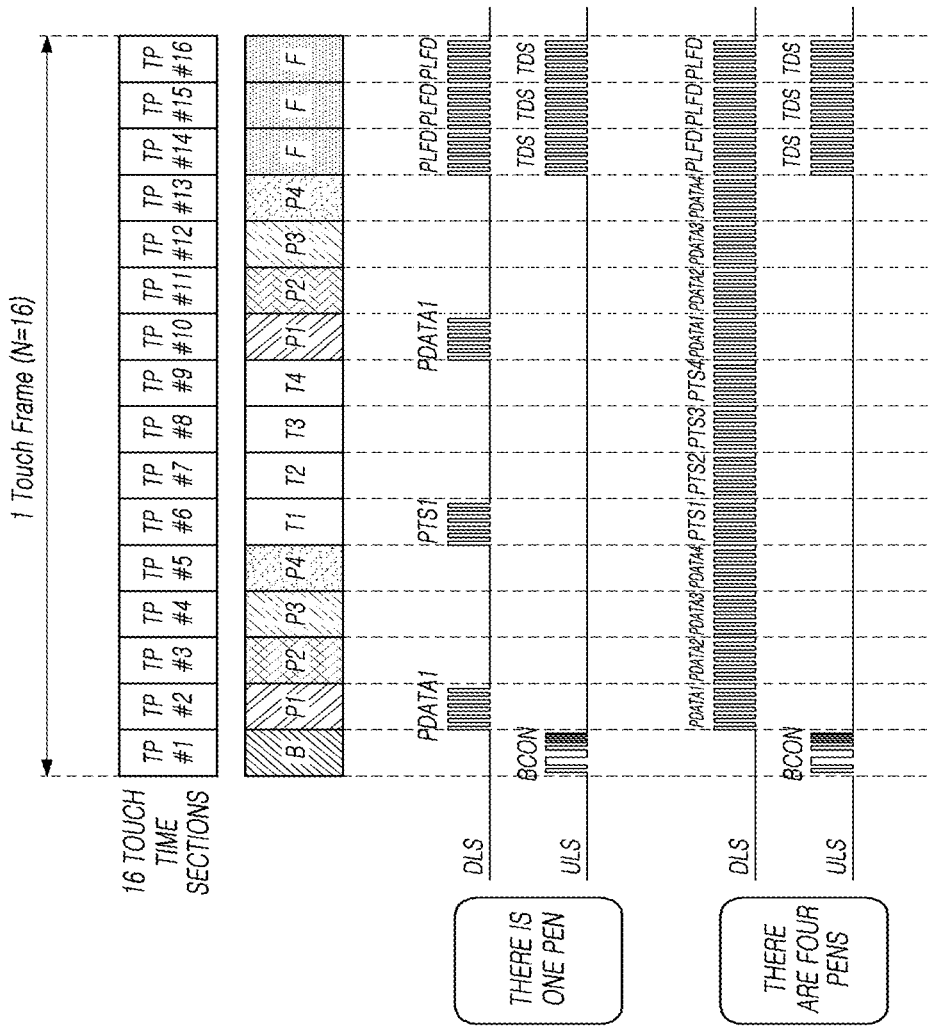
FIG. 21B is a diagram illustrating a driving state in which there is one pen and a driving state in which there is four pens in the configuration of touch time sections for a 4-pen mode illustrated in FIG. 21A in the touch display device according to embodiments of the present disclosure.

FIG. 21A is a diagram illustrating a configuration of touch time sections for a 4-pen mode in the touch display device 10 according to embodiments of the present disclosure. FIG. 21B is a diagram illustrating a driving state in which there is one pen (Pen 1) and a driving state in which there are four pens (Pen 1 to Pen 4) in the configuration of touch time sections illustrated in FIG. 21A.

In the following description, it is assumed that N=16, Nu=1, Nd=12, Nf=3, Np=8, and Nt=4 are set. That is, it is assumed that one touch frame time includes 16 touch time sections TP #1 to TP #16 and the 16 touch time sections TP #1 to TP #16 include one uplink transmission time section ULT, 12 downlink transmission time sections DLT, and three finger sensing time sections F. The uplink transmission time section ULT is a beacon transmission time section (B).

Referring to FIG. 21A, the 12 downlink transmission time sections DLT include eight pen position sensing time sections P1, P2, P3, and P4 and four pen tilt sensing time sections T1, T2, T3, and T4.

The eight pen position sensing time sections P1, P2, P3, and P4 include two pen position sensing time sections P1 allocated for a first pen (Pen 1), two pen position sensing time sections P2 allocated for a second pen (Pen 2), two pen position sensing time sections P3 allocated for a third pen (Pen 3), and two pen position sensing time sections P4 allocated for a fourth pen (Pen 4).

The four pen tilt sensing time sections T1, T2, T3, and T4 include one pen tilt sensing time section T1 allocated for the first pen (Pen 1), one pen tilt sensing time section T2 allocated for the second pen (Pen 2), one pen tilt sensing time section T3 allocated for the third pen (Pen 3), and one pen tilt sensing time section T4 allocated for the fourth pen (Pen 4).

In this configuration of touch time sections, the number of functional time sections B, P, T, and F, allocation positions thereof, or the like can be variously modified.

First, the operations of the touch display device 10 and a pen 20 when there is one pen (Pen 1) will be described below.

Referring to FIG. 21B, in the beacon transmission time section B, the signal transmitting/receiving circuit 511 of the touch circuit 300 applies a beacon signal BCON in which a voltage level changes irregularly or aperiodically to all or some of a plurality of touch electrodes TE.

Referring to FIG. 21B, the first pen (Pen 1) outputs first pen data PDATA1 in the pen position sensing time section P1 allocated for the first pen (Pen 1).

In the pen position sensing time section P1, the signal transmitting/receiving circuit 511 of the touch circuit 300 applies a DC voltage with a constant voltage level to all or some of the plurality of touch electrodes TE.

Referring to FIG. 21B, the first pen (Pen 1) outputs a first pen tilt signal PTS1 in the pen tilt sensing time section T1 allocated for the first pen (Pen 1).

In the pen tilt sensing time section T1, the signal transmitting/receiving circuit 511 of the touch circuit 300 applies a DC voltage with a constant voltage level to all or some of the plurality of touch electrodes TE.

When there is only one pen (Pen 1), the signal transmitting/receiving circuit 511 of the touch circuit 300 can supply a DC voltage with a constant voltage level to all or some of the plurality of touch electrodes TE in 12 downlink transmission time sections DLT including eight pen position sensing time sections P1, P2, P3, and P4 and four pen tilt sensing time sections T1, T2, T3, and T4.

Referring to FIG. 21B, the signal transmitting/receiving circuit 511 of the touch circuit 300 applies a touch driving signal TDS in which a voltage level changes regularly or periodically to all or some of the plurality of touch electrodes TE in three finger sensing time sections F.

Referring to FIG. 21B, the first pen (Pen 1) outputs a pen pulse signal PLFD which is a downlink signal DLS and in which a voltage level changes regularly or periodically in three finger sensing time sections F.

Accordingly, in three finger sensing time sections F, the pen pulse signal PLFD output from the first pen (Pen 1) is applied to one or more touch electrodes TE out of the plurality of touch electrodes TE.

The pen pulse signal PLFD corresponds to the touch driving signal TDS in frequency and phase. An unnecessary parasitic signal is not generated in the touch electrodes TE due to the pen pulse signal PLFD. Accordingly, even when a finger touch and a pen touch are simultaneously performed at adjacent positions, it is possible to accurately sense the finger touch and the pen touch.

Then, the operations of the touch display device 10 and four pens 20 (Pen 1 to Pen 4) when there are four pens (Pen 1 to Pen 4) will be described below.

Referring to FIG. 21B, in the beacon transmission time section B, the signal transmitting/receiving circuit 511 of the touch circuit 300 applies a beacon signal BCON in which a voltage level changes irregularly or aperiodically to all or some of the plurality of touch electrodes TE.

Referring to FIG. 21B, the signal transmitting/receiving circuit 511 of the touch circuit 300 can supply a DC voltage with a constant voltage level to all or some of the plurality of touch electrodes TE in 12 downlink transmission time sections DLT including eight pen position sensing time sections P1, P2, P3, and P4 and four pen tilt sensing time sections T1, T2, T3, and T4.

Referring to FIG. 21B, the first pen (Pen 1) outputs first pen data PDATA1 in the pen position sensing time section P1 allocated for the first pen (Pen 1). The second pen (Pen 2) outputs second pen data PDATA2 in the pen position sensing time section P2 allocated for the second pen (Pen 2). The third pen (Pen 3) outputs third pen data PDATA3 in the pen position sensing time section P3 allocated for the third pen (Pen 3). The fourth pen (Pen 4) outputs fourth pen data PDATA4 in the pen position sensing time section P4 allocated for the fourth pen (Pen 4).

Referring to FIG. 21B, the first pen (Pen 1) outputs a first pen tilt signal PTS1 in the pen tilt sensing time section T1 allocated for the first pen (Pen 1). The second pen (Pen 2) outputs a second pen tilt signal PTS2 in the pen tilt sensing time section T2 allocated for the second pen (Pen 2). The third pen (Pen 3) outputs a third pen tilt signal PTS3 in the pen tilt sensing time section T3 allocated for the third pen (Pen 3). The fourth pen (Pen 4) outputs a fourth pen tilt signal PTS4 in the pen tilt sensing time section T4 allocated for the fourth pen (Pen 4).

Referring to FIG. 21B, in three finger sensing time sections F, the signal transmitting/receiving circuit 511 of the touch circuit 300 supplies a touch driving signal TDS in which a voltage level changes regularly or periodically to all or some of the plurality of touch electrodes TE.

Referring to FIG. 21B, in the three finger sensing time sections F, the first to fourth pens Pen 1 to Pen 4 output a pen pulse signal PLFD which is a downlink signal DLS and in which a voltage level changes regularly or periodically.

Accordingly, in the three finger sensing time sections F, the pen pulse signal PLFD output from the first to fourth pens Pen 1 to Pen 4 is applied to one or more touch electrodes TE out of the plurality of touch electrodes TE.

The pen pulse signal PLFD corresponds to the touch driving signal TDS in frequency and phase. An unnecessary parasitic capacitance is not formed in the touch electrode TE due to the pen pulse signal PLFD. Accordingly, even when a finger touch and a pen touch are simultaneously performed at adjacent positions, it is possible to accurately sense the finger touch and the pen touch.

Figure 21C:
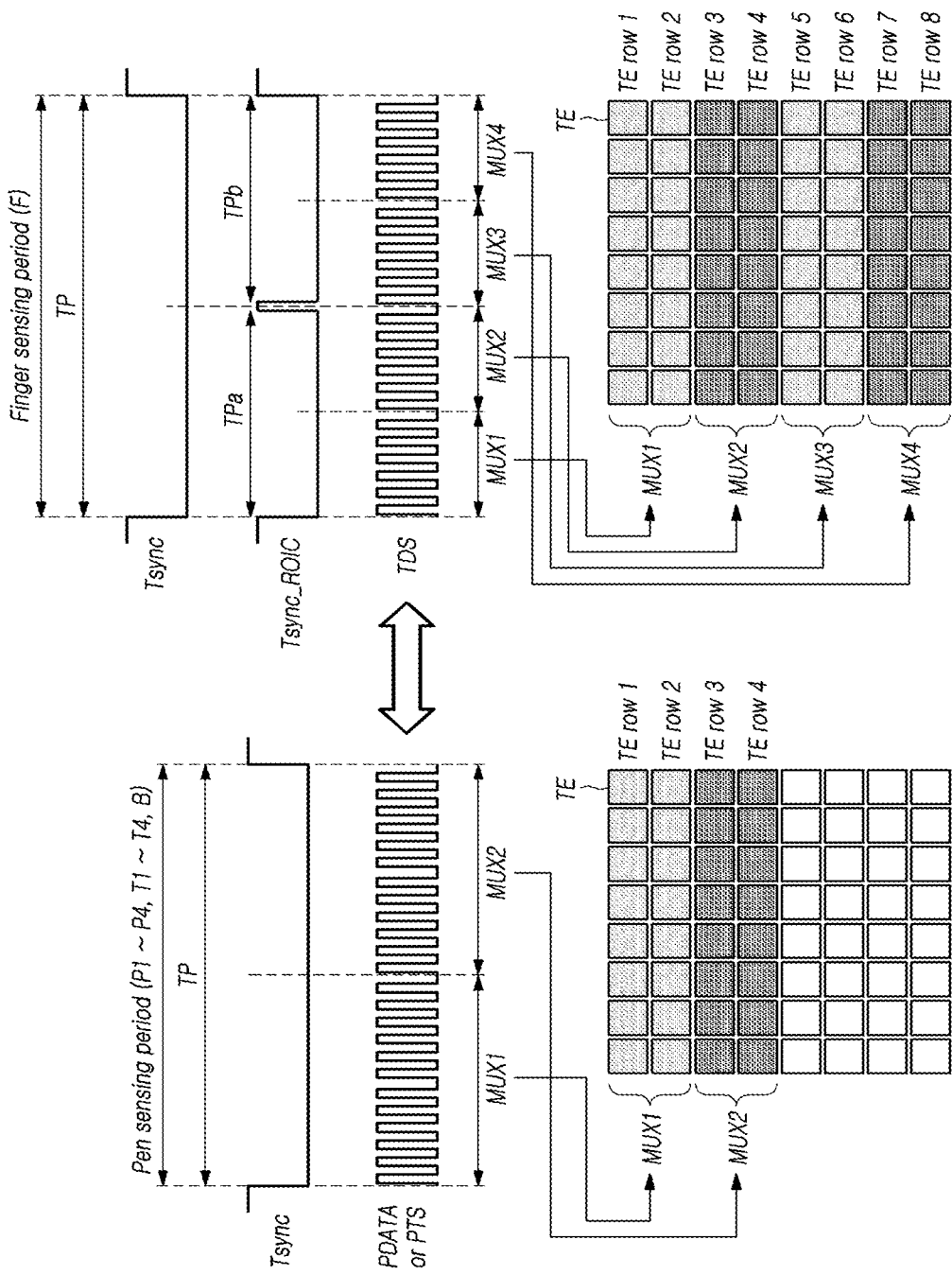
FIG. 21C is a diagram illustrating multiplexing driving control of the touch display device according to embodiments of the present disclosure.

FIG. 21C is a diagram illustrating multiplexing driving control of the touch display device 10 according to embodiments of the present disclosure. Description with reference to FIG. 21C will be made below in cooperative conjunction with FIG. 21B.

With the touch time section configurations of FIGS. 21A and 21B which are presented to sense pen touches of more pens 20, the number of touch time sections TP #14 to TP #15 which are allocated as the finger sensing time sections F cannot help decreasing. Accordingly, the touch display device 10 according to embodiments of the present disclosure can provide multiplexing driving control such that a desired finger touch sensing speed is obtained in spite of the decreased finger sensing time sections F. The multiplexing driving control will be described below.

Referring to FIGS. 21B and 21C, the touch display device 10 according to embodiments of the present disclosure drives and senses the touch panel TSP on the basis of a first multiplexing driving method in pen sensing periods, and drives and senses the touch panel TSP on the basis of a second multiplexing driving method in finger sensing periods.

For this purpose, the touch display device 10 according to embodiments of the present disclosure controls the multiplexing driving method when the pen sensing periods are switched to the finger sensing periods or when the finger sensing periods are switched to the pen sensing periods.

Multiplexing driving means that touch electrodes TE corresponding to a predetermined number of driven groups (16 in the example illustrated in FIG. 21C) are simultaneously driven or sensed. With the first multiplexing driving method and the second multiplexing driving method, the number of touch electrodes TE that can be driven or sensed in one touch time section can change and the sensing speed can change.

The second multiplexing driving method for the finger sensing period can drive or sense the larger number of touch electrodes TE in one touch time section than the first multiplexing method for the pen sensing period. That is, the number of touch electrodes sensed in each finger sensing time section F is larger than the number of touch electrodes sensed in each of the downlink transmission time sections P1 to P4 and T1 to T4. For example, the number of touch electrodes sensed in each finger sensing time section F is larger than two times the number of touch electrodes sensed in each of the downlink transmission time sections P1 to P4 and T1 to T4.

The pen sensing periods are touch time sections for sensing a pen touch and correspond the pen position sensing time sections P1 to P4 and the pen tilt sensing time sections T1 to T4 which are allocated to the first to thirteenth touch time sections TP #1 to TP #13 in FIG. 21B. In each of the first to thirteenth touch time sections TP #1 to TP #13 corresponding to the pen sensing periods, pen data PDATA (PDATA1 to PDATA4) corresponding to pen output signals or pen tilt signals PTS (PTS1 to PTS4) are applied to one or more touch electrodes TE in the touch panel TSP.

The finger sensing periods are touch time sections for sensing a finger touch and correspond the finger position sensing time sections F which are allocated to the fourteenth to sixteenth touch time sections TP #14 to TP #16 in FIG. 21B. In each of the fourteenth to sixteenth touch time sections TP #14 to TP #16 corresponding to the finger sensing periods, a touch driving signal TDS is applied to one or more touch electrodes TE in the touch panel TSP.

With the first multiplexing driving method, the touch circuit 300 divides one touch time section (one of TP #1 to TP #13) corresponding to the pen sensing period to a first group driving time MUX1 and a second group driving time MUX2, senses pen output signals PDATA and PTS via the touch electrodes TErow1 and TErow2 corresponding to a predetermined number of driven groups in a first group driving time MUX1, and senses pen output signals PDATA and PTS via the touch electrodes TErow3 and TErow4 corresponding to a predetermined number of driven groups in a second group driving time MUX2.

Accordingly, with the first multiplexing driving method, pen information or a pen position can be sensed in two multiplexing driving areas (areas in which TErow1 to TErow4 are arranged) corresponding to the first group driving time MUX1 and the second group driving time MUX2 in one touch time section (one of TP #1 to TP #13) corresponding to the pen sensing period. The first multiplexing driving method is also referred to as "two multiplexing driving (2 MUX Driving)."

With the second multiplexing driving method, the touch circuit 300 divides one touch time section (one of TP #14 to TP #16) corresponding to the finger sensing period to first to fourth group driving times MUX1 to MUX4, senses a touch sensing signal SENS via the touch electrodes TErow1 and TErow2 corresponding to a predetermined number of driven groups in the first group driving time MUX1, senses a touch sensing signal SENS via the touch electrodes TErow3 and TErow4 corresponding to a predetermined number of driven groups in the second group driving time MUX2, senses a touch sensing signal SENS via the touch electrodes TErow5 and TErow6 corresponding to a predetermined number of driven groups in the third group driving time MUX3, and senses a touch sensing signal SENS via the touch electrodes TErow7 and TErow8 corresponding to a predetermined number of driven groups in the fourth group driving time MUX4.

Accordingly, with the second multiplexing driving method, a finger touch can be sensed in four multiplexing driving areas (areas in which TErow1 to TErow8 are arranged) corresponding to the first to fourth group driving times MUX1 to MUX4 in one touch time section (one of TP #14 to TP #16) corresponding to the finger sensing period.

The second multiplexing driving method is also referred to as "four multiplexing driving (4 MUX Driving)."

As described above, by performing "four multiplexing driving (4 MUX Driving)" in each touch time section corresponding to the finger sensing period, a desired finger touch sensing speed can be obtained even when the number of finger touch time sections F in the 4-pen mode decreases.

Referring to FIG. 21C, the touch controller 520 of the touch circuit 300 can control a changing timing between the first multiplexing driving method (2 MUX driving) and the second multiplexing driving method (4 MUX driving) by generating a changed touch synchronization signal Tsync_ROIC which is generated on the basis of a touch synchronization signal Tsync and which includes two touch level signal sections TPa and TPb in one touch time section TP.

The touch driving circuit 510 may be supplied with both the touch synchronization signal Tsync and the changed touch synchronization signal Tsync_ROIC or may be selectively supplied with only one of the touch synchronization signal Tsync and the changed touch synchronization signal Tsync_ROIC depending on the types of the touch time sections.

The touch synchronization signal Tsync which distinguishes and defines the first to thirteenth touch time sections TP #1 to TP #13 corresponding to the pen sensing periods and the changed touch synchronization signal Tsync_ROIC which distinguishes and defines the fourteenth to sixteenth touch time sections TP #14 to TP #16 corresponding to the finger sensing periods may have different signal waveforms.

Referring to CASE 2 in FIG. 17, the touch display device 10 according to embodiments of the present disclosure is driven using the first multiplexing driving method for sensing a pen in the second to tenth touch time sections TP #2 to TP #10 and is driven using the second multiplexing driving method for sensing a finger in the eleventh touch time section TP #11. The touch display device 10 is driven using the first multiplexing driving method for sensing a pen in the twelfth touch time section TP #12, is driven using the second multiplexing driving method for sensing a finger in the thirteenth touch time section TP #13, and is driven using the first multiplexing driving method for sensing a pen in the fourteenth touch time section TP #14 again. That is, the touch display device 10 according to embodiments of the present disclosure can be switched between the first multiplexing driving method and the second multiplexing driving method depending on a sensing object required for each touch time section.

Figure 22:
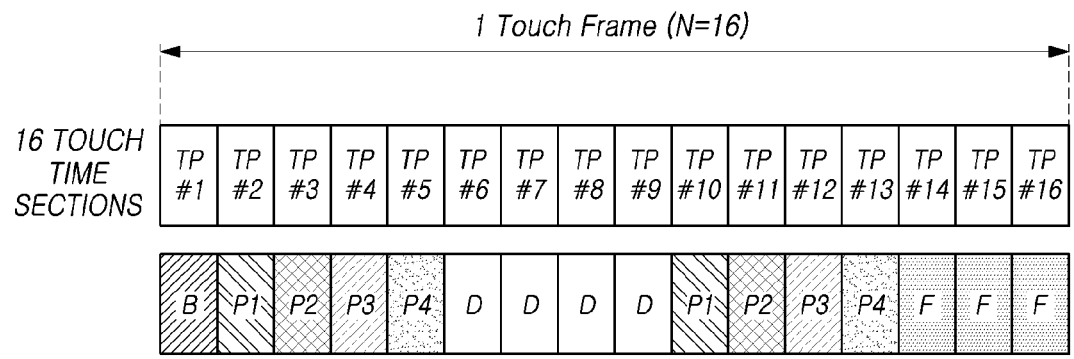
FIG. 22 is a diagram illustrating a configuration of touch time sections for a 4-pen mode when the touch display device according to embodiments of the present disclosure requests a pen for a specific pen ID.

FIG. 22 is a diagram illustrating a configuration of touch time sections for a 4-pen mode when the touch display device 10 according to embodiments of the present disclosure requests a pen 20 for a specific pen ID.

Referring to FIG. 22, when the touch display device 10 requests pens 20 for a specific pen ID, more time sections in which pen data PDATA can be received are required to receive all the specific pen IDs in one touch frame time.

Accordingly, the touch display device 10 can switch and allocate four pen tilt sensing time sections T1, T2, T3, and T4 in FIGS. 21A and 21B as the pen data transmission time sections D.

Figure 23:
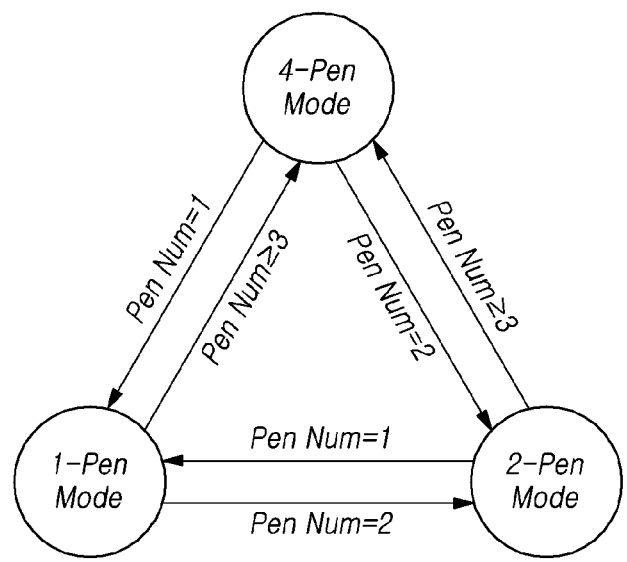
FIG. 23 is a diagram illustrating changing of a pen mode in the touch display device according to embodiments of the present disclosure.

FIG. 23 is a diagram illustrating changing of a pen mode in the touch display device 10 according to embodiments of the present disclosure. FIGS. 24A, 24B, and 24C are diagrams illustrating configurations of touch time sections for a 4-pen mode, a 2-pen ode, and a 1-pen mode in the touch display device 10 according to embodiments of the present disclosure.

Referring to FIG. 23, the touch circuit 300 switches a pen mode depending on the number of pens 20 which operate simultaneously in one touch frame time.

For example, the pen mode includes a 1-pen mode in which a pen touch of one pen 20 is sensed, a 2-pen mode in which pen touches of two pens 20 are sensed, and a 4-pen mode in which pen touches of three or more pens 20 are sensed.

While operating the 1-pen mode, the touch display device 10 switches the 1-pen mode to the 2-pen mode when the number of pens Pen Num increases to two, and switches the 1-pen mode to the 4-pen mode when the number of pens Pen Num increases to three or greater.

While operating the 2-pen mode, the touch display device 10 switches the 2-pen mode to the 1-pen mode when the number of pens Pen Num decreases to one, and switches the 2-pen mode to the 4-pen mode when the number of pens Pen Num increases to three or greater.

While operating the 4-pen mode, the touch display device 10 switches the 4-pen mode to the 1-pen mode when the number of pens Pen Num decreases to one, and switches the 4-pen mode to the 2-pen mode when the number of pens Pen Num decreases to two.

When the number of pens Pen Num is recognized to increase, the 1-pen mode is switched to the 2-pen mode or the 4-pen mode or the 2-pen mode is switched to the 4-pen mode.

The touch circuit 300 of the touch display device 10 can recognize the number of pens Pen Num using the pen pulse signal PLFD which is output from the pen 20 in the finger sensing time section F.

In the current touch frame time, the number of pens Pen Num can be recognized to increase in comparison with the previous touch frame time when the number of areas (including one or more touch electrodes TE) in which the pen pulse signal PLFD output from the pen 20 is received in the touch panel TSP increases in the finger sensing time section F.

For example, when the pen pulse signal PLFD output from the pen 20 is received by one area of the touch panel TSP (including one or more touch electrodes TE) in the finger sensing time section F of the first touch frame time and the pen pulse signal PLFD output from the pen 20 is received by three areas of the touch panel TSP (including one or more touch electrodes TE), the touch circuit 300 recognizes that the number of pens Pen Num increases from one to three and switches the pen mode from the 1-pen mode to the 4-pen mode.

When the number of pens Pen Num is recognized to decrease, the 2-pen mode is switched to the 1-pen mode or the 4-pen mode is switched to the 1-pen mode or the 2-pen mode.

The touch circuit 300 of the touch display device 10 can recognize that the number pens Pen Num decreases depending on whether a downlink signal DLS is generated in the downlink transmission time sections DLT.

The touch circuit 300 of the touch display device 10 can recognize that the number of pens Pen Num decreases when a downlink signal DLS is not generated in the downlink transmission time sections DLT corresponding to one or two or more pens 20 out of the downlink transmission time sections DLT allocated for the pens in the touch time section configuration in the current pen mode.

For example, when the touch circuit 300 operates in the 4-pen mode in which pen touches of the first to fourth pens Pen 1 to Pen 4 are sensed and it is ascertained that a downlink signal DLS such as pen data PDATA and a pen tilt signal PTS is not received in the downlink transmission time sections DLT allocated for the third pen Pen 3, the touch circuit 300 determines that the third pen Pen 3 disappears out of the first to fourth Pen 1 to Pen 4. However, since the number of pens Pen Num is equal to or greater than three, the pen mode is maintained in the 4-pen mode.

Thereafter, when the touch circuit 300 operates in the 4-pen mode in which pen touches of three pens Pen 1, Pen 2, and Pen 4 are sensed and it is ascertained that a downlink signal DLS such as pen data PDATA and a pen tilt signal PTS is not received in the downlink transmission time sections DLT allocated for the second pen Pen 2, the touch circuit 300 determines that the second pen Pen 2 disappears out of three pens Pen 1, Pen 2, and Pen 4 and the number of pens decreases to two Pen 1 and Pen 4. The pen mode is switched from the 4-pen mode to the 2-pen mode.

FIG. 24A illustrates a configuration of touch time sections for the 4-pen mode, FIG. 24B illustrates a configuration of touch time sections for the 2-pen mode, and FIG. 24C illustrates a configuration of touch time sections for the 1-pen mode.

Referring to FIGS. 24A to 24C, eight pen position sensing time sections P1, P2, P3, and P4 and four pen tilt sensing time sections T1, T2, T3, and T4 are allocated to 12 downlink transmission time sections regardless of the pen mode.

In the 4-pen mode, the eight pen position sensing time sections P1, P2, P3, and P4 are regularly distributed for four pens 20. Two pen position sensing time sections P1 are distributed for the first pen (Pen 1), other two pen position sensing time sections P2 are distributed for the second pen (Pen 2), other two pen position sensing time sections P3 are distributed for the third pen (Pen 3), and other two pen position sensing time sections P4 are distributed for the fourth pen (Pen 4).

In the 4-pen mode, the four pen tilt sensing time sections T1, T2, T3, and T4 are distributed for four pens 20, respectively.

In the 2-pen mode, the eight pen position sensing time sections P1 and P2 are regularly distributed for two pens 20. Four pen position sensing time sections P1 are distributed for the first pen (Pen 1) and other four pen position sensing time sections P2 are distributed for the second pen (Pen 2).

In the 2-pen mode, four pen tilt sensing time sections T1 and T2 are regularly distributed for two pens 20.

In the 1-pen mode, eight pen position sensing time sections P1 are all distributed for one pen 20. In the 1-pen mode, four pen tilt sensing time sections T1 are all distributed for one pen 20.

Referring to FIGS. 24A to 24C, at the time of switching the pen mode, the touch circuit 300 can (i) control the allocation order of the Nd downlink transmission time sections DLT and the Nf finger sensing time sections F in one touch frame time, (ii) control the number of downlink transmission time sections DLT which are allocated to the pen position sensing time sections P for each pen 20 in one touch frame time, or (iii) control the number of downlink transmission time sections DLT which are allocated to the pen tilt sensing time sections T for each pen 20 in one touch frame time.

The touch circuit 300 receives pen data PDATA which is a downlink signal DLS and in which a voltage level changes irregularly or aperiodically via one or more touch electrodes TE in the pen position sensing time sections P.

The touch circuit 300 receives a pen tilt signal PTS which is a downlink signal DLS and in which a voltage level changes regularly or periodically via one or more touch electrodes TE in the pen tilt sensing time sections T.

Referring to FIGS. 24A to 24C, when the number of pens 20 which simultaneously operate cooperatively in one touch frame time increases and the pen mode changes, the number of downlink transmission time sections DLT which are allocated to the pen position sensing time sections P for each pen 20 in one touch frame time decreases and the number of downlink transmission time sections DLT which are allocated to the pen tilt sensing time sections T for each pen 20 in one touch frame time decreases.

Referring to FIGS. 24A to 24C, when the number of pens 20 which simultaneously operate cooperatively in one touch frame time decreases and the pen mode changes, the number of downlink transmission time sections DLT which are allocated to the pen position sensing time sections P for each pen 20 in one touch frame time increases and the number of downlink transmission time sections DLT which are allocated to the pen tilt sensing time sections T for each pen 20 in one touch frame time increases.

Referring to FIGS. 24A to 24C, when the pen mode is switched, the sensing speed of one or more of a pen position, a pen tilt, and pen information can change.

For example, when the 4-pen mode is switched to the 1-pen mode or the 2-pen mode or the 2-pen mode is switched to the 1-pen mode, the sensing speed of one or more of a pen position, a pen tilt, and pen information for each pen can increase.

For example, when the 1-pen mode is switched to the 2-pen mode or the 4-pen mode or the 2-pen mode is switched to the 4-pen mode, the sensing speed of one or more of a pen position, a pen tilt, and pen information for each pen can decrease.

Figure 26:
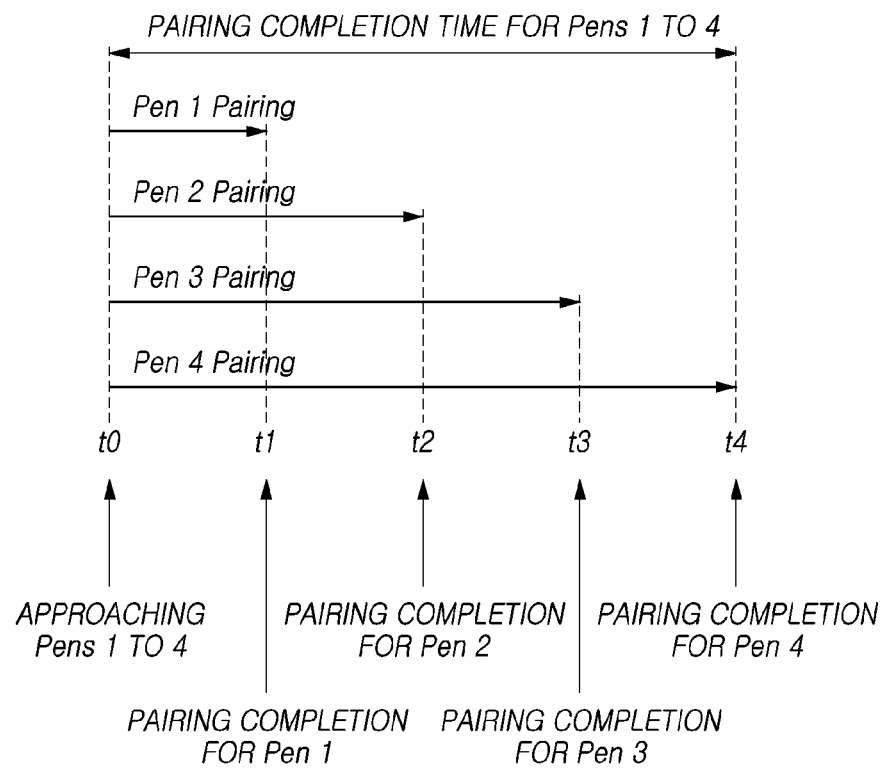

FIGS. 25 and 26 are diagrams illustrating a routine of pairing the touch display device 10 according to embodiments of the present disclosure with four pens (Pen 1, Pen 2, Pen 3, and Pen 4).

Referring to FIG. 25, in a first step (Step 1) of pairing with four pens (Pen 1, Pen 2, Pen 3, and Pen 4), the touch circuit 300 outputs an uplink signal ULS including a command (0: tone) to cause a pen 20 which is located close to the touch panel TSP and to which a temporary pen ID has not been given to react in a tone mode via the touch panel TSP in the uplink transmission time sections ULT in the first touch frame time. Here, the uplink signal ULS corresponds to a first beacon signal BCON.

It is assumed that four pens (Pen 1, Pen 2, Pen 3, and Pen 4) approach the touch display device 10 in the first touch frame time. Accordingly, the four pens (Pen 1, Pen 2, Pen 3, and Pen 4) receive an uplink signal ULS including a tone mode operation command (0: tone) via the touch panel TSP and operates in a full tone mode (0: full tone) in cooperation with the touch display device 10.

The full-tone mode is an operation mode in which the touch display device 10 and the pens 20 operate to detect a finger touch and a pen touch from the entire screen area by fully sensing the entire screen area.

In the sections of such a full-tone mode, a touch driving signal TDS in an AC signal format in which a voltage level changes is supplied from the touch circuit 300 to the touch panel TSP, and four pens (Pen 1, Pen 2, Pen 3, and Pen 4) output a pen pulse signal PLFD as a downlink signal DLS to the touch panel TSP.

Referring to FIG. 25, in a second step (Step 2) of pairing with four pens (Pen 1, Pen 2, Pen 3, and Pen 4), the touch circuit 300 supplies an uplink signal ULS which is a beacon signal BCON including specific pen ID request information (0: ID) for requesting for a pen 20 which is located close to the touch panel TSP and to which a temporary pen ID has not been given to the touch panel TSP in the beacon transmission time sections B which are the uplink transmission time sections ULT in the second touch frame time.

Accordingly, the first pen (Pen 1) receives the beacon signal BCON including the specific pen ID request information (0: ID) and outputs a downlink signal DLS (0: ID) including its first specific pen ID to the touch panel TSP in the downlink transmission time sections DLT.

The second pen (Pen 2) receives the beacon signal BCON including the specific pen ID request information (0: ID) and outputs a downlink signal DLS (0: ID) including its second specific pen ID to the touch panel TSP in the downlink transmission time sections DLT.

The third pen (Pen 3) receives the beacon signal BCON including the specific pen ID request information (0: ID) and outputs a downlink signal DLS (0: ID) including its third specific pen ID to the touch panel TSP in the downlink transmission time sections DLT.

The fourth pen (Pen 4) receives the beacon signal BCON including the specific pen ID request information (0: ID) and outputs a downlink signal DLS (0: ID) including its fourth specific pen ID to the touch panel TSP in the downlink transmission time sections DLT.

The touch circuit 300 receives a downlink signal DLS which is output from the first pen (Pen 1) and which includes the first specific pen ID via the touch panel TSP in the downlink transmission time sections DLT.

The touch circuit 300 receives a downlink signal DLS which is output from the second pen (Pen 2) and which includes the second specific pen ID via the touch panel TSP in the downlink transmission time sections DLT.

The touch circuit 300 receives a downlink signal DLS which is output from the third pen (Pen 3) and which includes the third specific pen ID via the touch panel TSP in the downlink transmission time sections DLT.

The touch circuit 300 receives a downlink signal DLS which is output from the fourth pen (Pen 4) and which includes the fourth specific pen ID via the touch panel TSP in the downlink transmission time sections DLT.

Referring to FIG. 25, in a third step (Step 3) of pairing with four pens (Pen 1, Pen 2, Pen 3, and Pen 4), the touch circuit 300 outputs a beacon signal BCON which is an uplink signal ULS including first pairing information (0: Pair1) including a first temporary pen ID given to the first pen (Pen 1) out of four pens (Pen 1, Pen 2, Pen 3, and Pen 4) or including information corresponding to the first temporary pen ID to the touch panel TSP in the beacon transmission time sections B which are the uplink transmission time sections ULT in the second touch frame time. Here, the first pairing information (0: Pair1) includes a hash value of the first specific pen ID. For example, the specific pen ID may be expressed in 52 bits, and the hash value of the specific pen ID or the temporary pen ID may be expressed in 6 to 8 bits.

Accordingly, the first pen (Pen 1) receives the beacon signal BCON including the first pairing information (0: Pair1), whereby pairing with the first pen (Pen 1) is completed. The first pen (Pen 1) performs a driving operation using the touch time sections (¼ of all) which are allocated for the first pen (Pen 1) in an entire driving period (1: default quarter).

In the downlink transmission time sections DLT in the third touch frame time, since the remaining pens (Pen 2, Pen 3, and Pen 4) other than the first pen (Pen 1) has not received pairing information associated therewith (that is, since a temporary pen ID has not been given), the remaining pens do not complete pairing and outputs a downlink DLS including its specific pen ID to the touch panel TSP again (0: ID).

That is, since the second pen (Pen 2) has not received pairing information associated therewith (that is, since a temporary pen ID has not been given), the second pen (Pen 2) does not complete pairing and outputs a downlink DLS including the second specific pen ID to the touch panel TSP again (0: ID). Since the third pen (Pen 3) has not received pairing information associated therewith (that is, since a temporary pen ID has not been given), the third pen (Pen 3) does not complete pairing and outputs a downlink DLS including the third specific pen ID to the touch panel TSP again (0: ID). Since the fourth pen (Pen 4) has not received pairing information associated therewith (that is, since a temporary pen ID has not been given), the fourth pen (Pen 4) does not complete pairing and outputs a downlink DLS including the fourth specific pen ID to the touch panel TSP again (0: ID).

Accordingly, the touch circuit 300 receives the downlink signal including the second specific pen ID from the second pen (Pen 2) again in the downlink transmission time sections DLT of the third touch frame time. In the downlink transmission time sections DLT of the third touch frame time, the touch circuit 300 receives the downlink signal including the third specific pen ID from the third pen (Pen 3) again and receives the downlink signal including the fourth specific pen ID from the fourth pen (Pen 4) again.

Referring to FIG. 25, in a fourth step (Step 4) of pairing with four pens (Pen 1, Pen 2, Pen 3, and Pen 4), the touch circuit 300 outputs a beacon signal BCON which is an uplink signal ULS including second pairing information (1: Pair2) including a second temporary pen ID given to the second pen (Pen 2) out of four pens (Pen 1, Pen 2, Pen 3, and Pen 4) or including information corresponding to the second temporary pen ID to the touch panel TSP in the beacon transmission time sections B which are the uplink transmission time sections ULT in the fourth touch frame time. Here, the second pairing information (1: Pair2) includes a hash value of the second specific pen ID.

Accordingly, the second pen (Pen 2) receives the beacon signal BCON including the second pairing information (1: Pair2), whereby pairing with the second pen (Pen 2) is completed. The second pen (Pen 2) performs a driving operation using the touch time sections (¼ of all) which are allocated for the second pen (Pen 2) in an entire driving period (2: default quarter). At this time, the first pen (Pen 1) performs a driving operation using the touch time sections (¼ of all) which are allocated for the first pen (Pen 1) (1: default quarter).

In the downlink transmission time sections DLT in the fourth touch frame time, since the remaining pens (Pen 3 and Pen 4) other than the first and second pens (Pen 1 and Pen 2) to which the temporary pen ID has been given and with which pairing has been completed have not received pairing information associated therewith (that is, since a temporary pen ID has not been given), the remaining pens do not complete pairing and outputs a downlink DLS including its specific pen ID to the touch panel TSP again (0: ID).

That is, since the third pen (Pen 3) has not received pairing information associated therewith (that is, since a temporary pen ID has not been given), the third pen (Pen 3) does not complete pairing and outputs a downlink DLS including the third specific pen ID to the touch panel TSP again (0: ID). Since the fourth pen (Pen 4) has not received pairing information associated therewith (that is, since a temporary pen ID has not been given), the fourth pen (Pen 4) does not complete pairing and outputs a downlink DLS including the fourth specific pen ID to the touch panel TSP again (0: ID).

Accordingly, the touch circuit 300 receives the downlink signal including the third specific pen ID from the third pen (Pen 3) again in the downlink transmission time sections DLT of the fourth touch frame time and receives the downlink signal including the fourth specific pen ID from the fourth pen (Pen 4) again.

Referring to FIG. 25, in a fifth step (Step 5) of pairing with four pens (Pen 1, Pen 2, Pen 3, and Pen 4), the touch circuit 300 outputs a beacon signal BCON which is an uplink signal ULS including third pairing information (2: Pair3) including a third temporary pen ID given to the third pen (Pen 3) out of four pens (Pen 1, Pen 2, Pen 3, and Pen 4) or including information corresponding to the third temporary pen ID to the touch panel TSP in the beacon transmission time sections B which are the uplink transmission time sections ULT in the fifth touch frame time. Here, the third pairing information (2: Pair3) includes a hash value of the third specific pen ID.

Accordingly, the third pen (Pen 3) receives the beacon signal BCON including the third pairing information (2: Pair3), whereby pairing with the third pen (Pen 3) is completed. The third pen (Pen 3) performs a driving operation using the touch time sections (¼ of all) which are allocated for the third pen (Pen 3) in an entire driving period (3: default quarter). At this time, the first pen (Pen 1) performs a driving operation using the touch time sections (¼ of all) which are allocated for the first pen (Pen 1) (1: default quarter). The second pen (Pen 2) performs a driving operation using the touch time sections (¼ of all) which are allocated for the second pen (Pen 2) (2: default quarter).

In the downlink transmission time sections DLT in the fifth touch frame time, since the fourth pen (Pen 4) other than the first to third pens (Pen 1, Pen 2, and Pen 3) to which a temporary pen ID has been given and with which pairing has been completed have not received pairing information associated therewith (that is, since a temporary pen ID has not been given), the fourth pen does not complete pairing and outputs a downlink DLS including its specific pen ID to the touch panel TSP again (0: ID).

Accordingly, the touch circuit 300 receives the downlink signal including the fourth specific pen ID from the fourth pen (Pen 4) again in the downlink transmission time sections DLT of the fifth touch frame time.

Referring to FIG. 25, in a sixth step (Step 6) of pairing with four pens (Pen 1, Pen 2, Pen 3, and Pen 4), the touch circuit 300 outputs a beacon signal BCON which is an uplink signal ULS including fourth pairing information (3: Pair4) including a fourth temporary pen ID given to the fourth pen (Pen 4) out of four pens (Pen 1, Pen 2, Pen 3, and Pen 4) or including information corresponding to the fourth temporary pen ID to the touch panel TSP in the beacon transmission time sections B which are the uplink transmission time sections ULT in the sixth touch frame time. Here, the fourth pairing information (3: Pair4) includes a hash value of the fourth specific pen ID.

Accordingly, the fourth pen (Pen 4) receives the beacon signal BCON including the fourth pairing information (3: Pair4), whereby pairing with the fourth pen (Pen 4) is completed. The fourth pen (Pen 4) performs a driving operation using the touch time sections (¼ of all) which are allocated for the fourth pen (Pen 4) in the entire driving period (4: default quarter). At this time, the first pen (Pen 1) performs a driving operation using the touch time sections (¼ of all) which are allocated for the first pen (Pen 1) (1:

default quarter). The second pen (Pen 2) performs a driving operation using the touch time sections (¼ of all) which are allocated for the second pen (Pen 2) (2: default quarter). The third pen (Pen 3) performs a driving operation using the touch time sections (¼ of all) which are allocated for the third pen (Pen 3) (3: default quarter).

In this way, pairing with four pens (Pen 1, Pen 2, Pen 3, and Pen 4) is all completed.

Referring to FIGS. 25 and 26, when the touch display device 10 supplies pairing information to one of the four pens (Pen 1, Pen 2, Pen 3, and Pen 4), a pen (pens) to which a temporary pen ID has not been given does not stop its operation and re-transmits its specific pen ID. This pairing process is different from the pairing routine illustrated in FIG. 15.

Referring to FIG. 26, since the pairing process for the first pen (Pen 1), the pairing process for the second pen (Pen 2), the pairing process for the third pen (Pen 3), and the pairing process for the fourth pen (Pen 4) slightly overlap each other in time, all the pairing times for the four pens (Pen 1, Pen 2, Pen 3, and Pen 4) are shorter than those in the pairing routine illustrated in FIG. 15.

According to the above embodiments of the present disclosure, it is possible to provide a display function and a finger touch sensing function and to effectively simultaneously sense a plurality of pens 20.

According to the embodiments of the present disclosure, it is possible to effectively simultaneously sense a plurality of pens 20 in a predetermined touch frame time (a driving time) by simultaneously sensing pen information and sensing a pen position using pen data PDATA.

According to the embodiments of the present disclosure, it is possible to rapidly process pairing between the touch display device 10 and a plurality of pens 20 within a short time.

The above description has been presented to enable any person skilled in the art to make and use the technical idea of the present invention, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present invention. The above description and the accompanying drawings provide an example of the technical idea of the present invention for illustrative purposes only. That is, the disclosed embodiments are intended to illustrate the scope of the technical idea of the present invention. Thus, the scope of the present invention is not limited to the embodiments shown, but is to be accorded the widest scope consistent with the claims. The scope of protection of the present invention should be construed based on the following claims, and all technical ideas within the scope of equivalents thereof should be construed as being included within the scope of the present invention.

What is claimed is:

1. A touch display device that operates in cooperation with one or more pens, comprising:
    a touch panel in which a plurality of touch electrodes are arranged; and
    a touch circuit that applies an uplink signal to all or some of the plurality of touch electrodes in N touch time sections included in each touch frame time and receives a downlink signal output from the one or more pens having received the uplink signal via one or more touch electrodes of the plurality of touch electrodes,
    wherein the touch circuit receives pen data via the one or more touch electrodes from the one or more pens and simultaneously senses pen information and a pen position of the one or more pens based on the pen data, wherein the pen data comprises a downlink signal output from the one or more pens, and a voltage level of the pen data changes irregularly or aperiodically,
    wherein the N touch time sections include Nu uplink transmission time sections in which an uplink signal in which a voltage level changes irregularly or aperiodically is transmitted from the touch panel to the one or more pens, Nd downlink transmission time sections in which a downlink signal is transmitted from the one or more pens to the touch panel, and Nf finger sensing time sections in which a finger touch is sensed,
    wherein Nu≥1, Nd≥1, and Nf≥1 are satisfied,
    wherein the Nd downlink transmission time sections include Np pen position sensing time sections and 1≤Np≤Nd is satisfied, and
    wherein the touch circuit receives pen data which is a downlink signal output from the one or more pens and in which a voltage level changes irregularly or aperiodically from the one or more pens via the one or more touch electrodes out of the plurality of touch electrodes and simultaneously senses pen information and a pen position of the one or more pens based on the pen data.

2. The touch display device according to claim 1, wherein in each uplink transmission time section, the touch circuit applies a beacon signal which is an uplink signal transmitted to the one or more pens and in which pen driving control information is expressed by change of a voltage level to all or some of the plurality of touch electrodes, and
    wherein a signal waveform of the downlink signal which is output from the one or more pens in each downlink transmission time section changes according to the beacon signal.

3. The touch display device according to claim 1, wherein the Nd downlink transmission time sections include Nt pen tilt sensing time sections and the Np pen position sensing time sections and Np+Nt=Nd is satisfied, and
    wherein, between the Nt pen tilt sensing time sections and the Np pen position sensing time sections, a type of a tip via which the downlink signal is output from the one or more pens is different and a signal waveform of the downlink signal output from the one or more pens is different.

4. The touch display device according to claim 3, wherein in the pen position sensing time sections, the touch circuit receives the pen data which is a downlink signal output from a first tip of the one or more pens and in which a voltage level changes irregularly or aperiodically via the one or more touch electrodes and simultaneously senses the pen information and the pen position of the one or more pens on the basis of the pen data, and
    wherein in the pen tilt sensing time sections, the touch circuit receives a pen tilt signal which is a downlink signal output from a second tip which is different in shape from the first tip of the one or more pens and in which a voltage level changes regularly or periodically via the one or more touch electrodes and senses a pen tilt of the one or more pens on the basis of the pen tilt signal.

5. The touch display device according to claim 3, wherein the Nd downlink transmission time sections include Ni pen data transmission time sections and the Np pen position sensing time sections and Np+Ni=Nd is satisfied, and wherein, between the Nt pen tilt sensing time sections and the Np pen position sensing time sections, a type of a tip via which the downlink signal is output from the one or more pens is the same.

6. The touch display device according to claim 5, wherein in the pen position sensing time sections, the touch circuit receives the pen data which is a downlink signal output from a first tip of the pen and in which a voltage level changes irregularly or aperiodically via the one or more touch electrodes and simultaneously senses the pen information and the pen position of the one or more pens on the basis of the pen data, and wherein in the pen data transmission time sections, the touch circuit receives other pen data which is a downlink signal output from the first tip of the one or more pens and in which a voltage level changes irregularly or aperiodically via the one or more touch electrodes and senses other pen information of the one or more pens on the basis of the other pen data.

7. The touch display device according to claim 1, wherein the touch circuit applies a beacon signal in which a voltage level changes irregularly or aperiodically to all or some of the plurality of touch electrodes in the Nu uplink transmission time sections, wherein the touch circuit applies a DC voltage in which a voltage level is constant to all or some of the plurality of touch electrodes in the Nd downlink transmission time sections, and wherein the touch circuit applies a touch driving signal in which a voltage level changes regularly or periodically to all or some of the plurality of touch electrodes in the Nf finger sensing time sections.

8. The touch display device according to claim 7, wherein a pen pulse signal which is output from the one or more pens and in which a voltage level changes regularly or periodically is applied to the one or more touch electrodes out of the plurality of touch electrodes and the pen pulse signal corresponds to the touch driving signal in frequency and phase.

9. The touch display device according to claim 1, wherein the pen data which is received via the one or more touch electrodes in the touch circuit in the Np pen position sensing time sections includes a plurality of pulses, wherein a high-level section of at least one pulse out of the plurality of pulses is longer than the high-level section of other pulses, and wherein a low-level section of at least one pulse out of the plurality of pulses is longer than the low-level section of other pulses.

10. The touch display device according to claim 9, wherein the pen data includes a plurality of sections in which a plurality of symbols corresponding to the pen information are expressed, wherein the plurality of sections include two sections including pulses, wherein one of the two sections includes pulses having a same phase as a driving signal which is applied from the touch circuit to the touch panel and in which a voltage level changes regularly or periodically, and wherein the other of the two sections includes pulses having a phase opposite to those of the driving signal.

11. The touch display device according to claim 10, wherein the plurality of sections include a section which has a DC voltage or which is electrically floating.

12. The touch display device according to claim 1, wherein the touch circuit outputs an uplink signal including a command to cause the one or more pens approaching the touch panel to react to the touch panel in the uplink transmission time sections of a first touch frame time, wherein the touch circuit receives a downlink signal which is output from a first pen and which includes a first specific pen ID via the touch panel and receives a downlink signal which is output from a second pen and which includes a second specific pen ID via the touch panel in the downlink transmission time sections of a second touch frame time, wherein the touch circuit outputs an uplink signal which includes a first temporary pen ID given to the first pen or which includes pairing information including information corresponding to the first temporary pen ID to the touch panel in the uplink transmission time sections of a third touch frame time, and wherein the touch circuit receives a downlink signal which is output from the second pen and which includes the second specific pen ID again via the touch panel in the downlink transmission time sections of the third touch frame time.

13. The touch display device according to claim 1, wherein the touch circuit performs control such that a number of touch electrodes which are sensed in each of the finger sensing time sections is greater than a number of touch electrodes which are sensed in each of the downlink transmission time sections.

14. The touch display device according to claim 5, wherein the touch circuit changes a pen mode depending on a number of pens which simultaneously operate cooperatively in one touch frame time, and wherein an allocation order of the Nd downlink transmission time sections and the Nf finger sensing time sections in the one touch frame time is controlled, a number of downlink transmission time sections which are allocated to the pen position sensing time sections for each pen in the one touch frame time is controlled, or a number of downlink transmission time sections which are allocated to the pen tilt sensing time sections for each pen in the one touch frame time is controlled at the time of changing the pen mode.

15. The touch display device according to claim 14, wherein, when the number of pens which simultaneously operate in the one touch frame time increases and the pen mode is changed, the number of downlink transmission time section which are allocated to the pen position sensing time sections for each pen in the one touch frame time decreases and the number of downlink transmission time section which are allocated to the pen tilt sensing time sections for each pen in the one touch frame time decreases.

16. The touch display device according to claim 14, wherein a sensing speed of one or more of a pen position, a pen tilt, and pen information is changed at the time of changing the pen mode.

17. The touch display device according to claim 1, wherein when a number of pens which are to be sensed in one touch frame time is m, a number of downlink transmission time sections in the one touch frame time is equal to or greater than 3×m.

18. A touch circuit of a touch display device, comprising:
a signal transmitting/receiving circuit that applies an uplink signal to all or some of a plurality of touch electrodes included in a touch panel in N touch time sections included in each touch frame time, and receives a downlink signal output from one or more pens having received the uplink signal via the touch panel via one or more touch electrodes of the plurality of touch electrodes; and an analog-to-digital conversion circuit that generates a digital sensing value for the downlink signal, wherein the signal transmitting/receiving circuit receives pen data via the one or more touch electrodes among the plurality of touch electrodes and simultaneously generates and outputs sensing data for sensing pen information and a pen position of the one or more pens based on the pen data, the pen data comprising a downlink signal output from the one or more pens, a voltage level of the pen data changes irregularly or aperiodically, wherein the N touch time sections include Nu uplink transmission time sections in which an uplink signal in which a voltage level changes irregularly or aperiodically is transmitted from the touch panel to the one or more pens, Nd downlink transmission time sections in which a downlink signal is transmitted from the one or more pens to the touch panel, and Nf finger sensing time sections in which a finger touch is sensed, wherein $Nu \geq 1$, $Nd \geq 1$, and $Nf \geq 1$ are satisfied, wherein the Nd downlink transmission time sections include Np pen position sensing time sections and $1 \leq Np \leq Nd$ is satisfied, and wherein the touch circuit receives pen data which is a downlink signal output from the one or more pens and in which a voltage level changes irregularly or aperiodically from the one or more pens via the one or more touch electrodes out of the plurality of touch electrodes and simultaneously senses pen information and a pen position of the one or more pens based on the pen data.

19. The touch circuit according to claim 18, wherein the signal transmitting/receiving circuit outputs pairing information for pairing with the one or more pens to the touch panel, and wherein the pairing information comprises a hash value of a first specific pen ID.

* * * * *